(12) United States Patent
White

(10) Patent No.: US 7,057,637 B2
(45) Date of Patent: Jun. 6, 2006

(54) REFLECTED BACKDROP FOR COMMUNICATIONS SYSTEMS

(76) Inventor: Peter McDuffie White, 5711 Preston Oaks Rd., Apt. 1142, Dallas, TX (US) 75254

( * ) Notice: Subject to any disclaimer, the term of this patent is extended or adjusted under 35 U.S.C. 154(b) by 33 days.

(21) Appl. No.: 10/897,453

(22) Filed: Jul. 23, 2004

(65) Prior Publication Data
US 2005/0237381 A1    Oct. 27, 2005

Related U.S. Application Data

(60) Provisional application No. 60/564,098, filed on Apr. 21, 2004.

(51) Int. Cl.
*H04N 7/14* (2006.01)
(52) U.S. Cl. ............................... 348/14.16; 348/14.08
(58) Field of Classification Search .. 348/14.01–14.09, 348/14.1, 14.11, 14.12, 14.13, 14.16; 353/79, 353/122, 15, 77, 98; 359/460
See application file for complete search history.

(56) References Cited

U.S. PATENT DOCUMENTS

| | | | | |
|---|---|---|---|---|
| 4,022,461 A | * | 5/1977 | Harris | ........................ 472/75 |
| 4,232,939 A | | 11/1980 | Kikuchi | |
| 4,298,246 A | | 11/1981 | Iwamura | |
| 4,309,073 A | | 1/1982 | Nishimura et al. | |
| 4,558,922 A | | 12/1985 | Smith | |
| 4,732,441 A | | 3/1988 | Cheng | |
| 4,738,522 A | | 4/1988 | Lunde et al. | |
| 4,805,895 A | | 2/1989 | Rogers | |
| 4,965,819 A | | 10/1990 | Kannes | |
| 5,061,061 A | | 10/1991 | Robley et al. | |
| 5,117,285 A | | 5/1992 | Nelson et al. | |
| 5,194,955 A | | 3/1993 | Yoneta et al. | |
| 5,221,937 A | | 6/1993 | Machtig | |
| 5,255,028 A | | 10/1993 | Biles | |
| 5,278,596 A | | 1/1994 | Machtig | |
| 5,365,354 A | | 11/1994 | Jannson et al. | |
| 5,438,357 A | | 8/1995 | McNelley | |
| 5,473,469 A | | 12/1995 | Magocs et al. | |
| 5,528,425 A | | 6/1996 | Beaver | |
| 5,532,736 A | | 7/1996 | Kuriki et al. | |
| 5,541,769 A | | 7/1996 | Ansley et al. | |
| 5,550,754 A | | 8/1996 | McNelley et al. | |

(Continued)

FOREIGN PATENT DOCUMENTS

WO    WO 94/30016    12/1994

(Continued)

OTHER PUBLICATIONS

"Eye-to-Eye Contact for Desk-to-Desk Video Conferencing," IBM Technical Disclosure Bulletin, vol. 35, No. 2, Jul. 1992, pp. 316-318.

(Continued)

*Primary Examiner*—Melur Ramakrishnaiah
(74) *Attorney, Agent, or Firm*—Slater & Matsil, L.L.P.

(57) ABSTRACT

A video conferencing system has a two-way mirror, which is between the observer and the display device, positioned at an angle to reflect a backdrop surface. The backdrop surface, which is further away from the two-way mirror than the image plane of the image display device, appears superimposed in a position behind the image of a person from the remote location. A camera is located in the backdrop at a position along the line of sight of the transmitted image so that a perceived eye contact is achieved.

33 Claims, 16 Drawing Sheets

U.S. PATENT DOCUMENTS

| | | | |
|---|---|---|---|
| 5,573,325 A | 11/1996 | Lekowski | |
| 5,609,939 A | 3/1997 | Petersen et al. | |
| 5,619,254 A | 4/1997 | McNelley | |
| 5,639,151 A | 6/1997 | McNelley et al. | |
| 5,685,625 A | 11/1997 | Beaver | |
| 5,777,665 A | 7/1998 | McNelley et al. | |
| 5,782,547 A | 7/1998 | Machtig et al. | |
| 5,837,346 A | 11/1998 | Langille et al. | |
| 5,865,519 A | 2/1999 | Maass | |
| 5,890,787 A | 4/1999 | McNelley et al. | |
| 5,892,538 A | 4/1999 | Gibas | |
| 5,923,469 A | 7/1999 | Machtig et al. | |
| 5,953,052 A | 9/1999 | McNelley et al. | |
| 6,023,369 A | 2/2000 | Goto | |
| 6,042,233 A | 3/2000 | Mihashi et al. | |
| 6,042,235 A | 3/2000 | Machtig et al. | |
| 6,044,226 A | 3/2000 | McWilliams | |
| 6,104,424 A * | 8/2000 | McNelley | 348/14.16 |
| 6,243,130 B1 | 6/2001 | McNelley et al. | |
| 6,290,359 B1 | 9/2001 | Shriver | |
| 6,323,892 B1 * | 11/2001 | Mihara | 348/14.01 |
| 6,421,174 B1 | 7/2002 | Ooshima et al. | |
| 6,600,600 B1 | 7/2003 | Chen | |
| 6,710,797 B1 | 3/2004 | McNelley et al. | |

FOREIGN PATENT DOCUMENTS

| | | |
|---|---|---|
| WO | WO 96/09722 | 3/1996 |
| WO | WO 01/11880 A1 | 2/2001 |

OTHER PUBLICATIONS

Komatsu, T., et al., "41.2: Multiscreen Display Method for Expanding Stereoscopic Viewing Space," SID International Symposium—Digest of Technical Papers, US, Playa Del Rey, SID, vol. 24, May 16, 1993, pp. 905-908.

De Silva, L.C., et al., "A Multiple Person Eye Contact (MPEC) Teleconferencing System," Proceedings of the International Conference on Image Processing (ICIP), US, Los Alamitos, IEEE Comp. Soc. Press, Oct. 23, 1995, pp. 607-610.

* cited by examiner

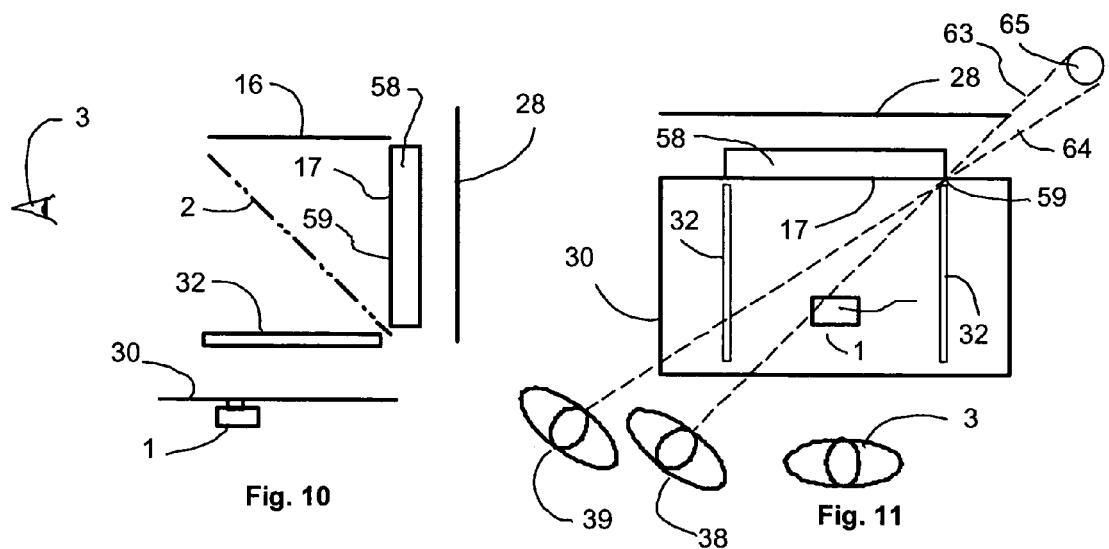
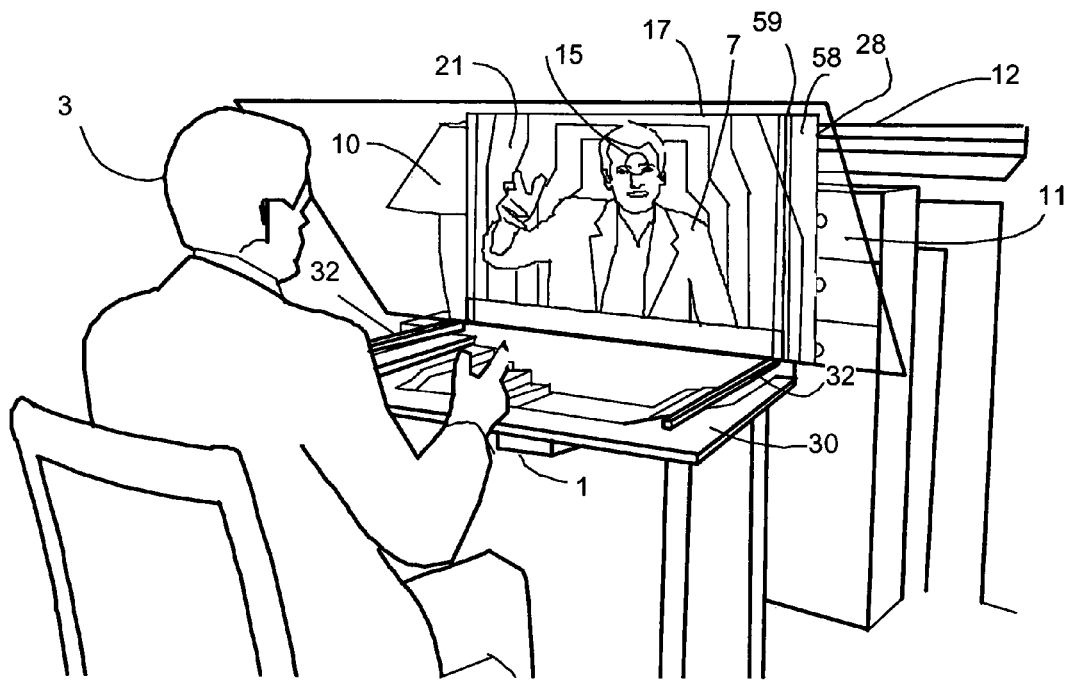

REFLECTED BACKDROP FOR COMMUNICATIONS SYSTEMS

This application claims priority to provisional patent application Ser. No. 60/564,098, filed Apr. 21, 2004, and entitled "Reflected Background for Communications System," which application is hereby incorporated herein by reference.

TECHNICAL FIELD

The present invention relates to video conferencing apparatus and more particularly to apparatus that displays the transmitted participant to appear to be in front of a backdrop and to have a perceived eye contact.

BACKGROUND

There is a need for a new type of distance communications system that achieves "telepresence" which is commonly understood to be a perception of presence of a person from a distant location. Telepresence covers a broad range of display and interactive technologies. Most configurations display a flat image on a screen or a monitor. The flat images produced by these products and display systems do not create the perception of the presence of the transmitted person in the three dimensional setting of the receiving location.

The perception of the presence of a person within a room can be a powerful form of communication. Observers respond differently to an effective display of a life-size person in a three dimensional setting compared to the common appearance of a person on a flat screen, such as normal television. In order to achieve this perception, the image of the person should not be contained by the appearance of the frame of a screen. This can be accomplished by having the distant person captured against a black background and superimposing the image with a backdrop and room setting appearing behind the person. With the proper balance of light on the backdrop and room setting the image of the person can appear to be present in free space in front of the background.

An additional feature in achieving effective telepresence is the perception of eye contact. It is well known that eye contact can be simulated by positioning a camera on the opposite side of a two-way mirror so that it matches the reflected view of the line of sight of the displayed person from the distant location.

The combination of eye contact and the appearance in a three dimensional setting were presented in the "Communications System" by White WO 01/11880 patent filed Aug. 10, 1999 and published Feb. 15, 2001 and U.S. patent Ser. No. 10/049,253 filed Jul. 24, 2000, and incorporated herein by reference. Subsequent variations of these configurations appeared in U.S. Pat. No. 6,710,797 "Adaptable Teleconferencing Eye Contact Terminal" by McNelley filed Dec. 27, 2001. These previous configurations have reflected an image of a life-size person so that it is superimposed into a three dimensional setting. This setting, which is viewed through the two-way mirror, could incorporate a chair and background to give the perception that the person is in the room with the audience. This configuration requires that a large amount of space is dedicated to the display system, however.

Most prior art systems are large and bulky and hence cannot physically fit into most conference rooms. Thus, they are not acceptable for the majority of applications. Furthermore, the appearance of the transmitted person into a room setting poses many problems. Since the image of the transmitted person is superimposed into the room setting, any light surfaces or objects in the room setting will be visible through the image of the person. This will result in a "ghost" effect for the person. In order to control this visual effect all of the background needs to be illuminated to the exact level of brightness. It is impractical to specially set the light levels and to select dark colors for all objects in the room for all applications other than theatrical settings. As a result this configuration is generally unacceptable for normal business usage.

Even with producing custom room settings for these reflected image display systems, they have a fundamental problem caused by the location of the displayed image. Since the image of the person is reflected by the two-way mirror, the image display system is positioned between the observer and the mirror. As a result, the image on the image display system could be directly viewed by the observer. This would break the illusion of the presence of the person as seen in the reflection of the image in the two-way mirror. There are various methods for minimizing the view of the display system, such as using a micro louver film to block the image from the observation zone. However, these techniques are not totally effective and darken the image to half or less of its brightness. Darkening the image can be a serious problem in that the two-way mirror reflects only 30% to 50% percent of the light, causing the image to be only a small fraction of the brightness of the image display system. Due to the resulting low brightness of the image, the quality is unsatisfactory.

PRIOR ART CONFIGURATIONS

Previous configurations have achieved eye contact. The prior art of FIG. 1 illustrates a two-way mirror 2 that is angled so that it reflects an image display device 4, such as a monitor or screen. A two-way mirror is typically a partially silvered transparent substrate, which could be glass, plastic, Mylar or other transparent material. A two-way mirror has also been referred to as a one way mirror or a beamsplitter. The reflected image 5 will appear to be behind the two-way mirror 2. A camera 1 is placed behind the two-way mirror in a position on the eye level of the person displayed on the reflection of the monitor. The camera is surrounded by an opaque enclosure 13 so that no light is viewed by the camera as a reflection on the two-way mirror. The inside of the enclosure is black so that the observer 3 does not see the camera or the enclosure through the two-way mirror and the only image visible to the observer is the reflection 5 of the image on the image display device 4.

The prior art of FIG. 2 shows a configuration where the camera 1 is positioned behind the location of the appearance of the reflected image 5 on the image display device 4. The camera 1 is positioned in a background within a three dimensional setting. An overhead blackout panel 14 is positioned above the two-way mirror 2 so that the camera view of the reflection on the two-way mirror is of a black surface. In this manner the only light exposing the image for the camera will be of the observation zone around the observer 3 on the opposite side of the two-way mirror 2.

FIG. 3 shows a perspective view of the prior art of FIG. 2. An image of a person from a remote location is displayed on an image display device 4. In this prior art the image on the image display device 4 is in view of the observer 3, which is a distraction from the intended view of the reflection of the image of the transmitted person 6. If the image of the person in the remote location is produced with a black background, the frame of the reflected image 5 will not add light to the superimposed view of the background and the image of the person 6 will be viewed by the observer as a free standing image within the three dimensional setting. A camera 1 may be placed in the room setting at a position that is at the eye level of the observer. Since the reflected image of the remote person is superimposed into the scene of the room, the normally lit background 12 in the room will be seen through the image of the person 6. In particular, a light object, such as a lamp 10, would clearly show through to give a "ghost" quality to the image of the person 6.

A disadvantage of this configuration is that a color shift can take place when the reflection on the two-way mirror 2 is viewed from an angle of approximately 45 degrees. This color shift can cause the reflected image of the person 6 to appear green. Also, any imperfections or distortion in the two-way mirror will cause the image of the person to be degraded. This can be a particular problem if the two-way mirror is comprised of plastic or Mylar substrate.

The prior art of FIG. 4 illustrates an image display device 17 showing an image of a person from a remote location, which can be viewed through a two-way mirror 2. The two-way mirror 2 is angled so that a camera 1 views a reflection of the observer 3 and the surrounding observation zone. The camera 1 is placed below a two-way mirror 2 at a position in the line of sight of the person displayed on the monitor. Above the two-way mirror is a black panel 16 that is in the camera view through the two-way mirror so that the only light exposing the image for the camera is the reflected view of the observation zone.

This prior art does not address the problems that may arise from the superimposing of the reflected image of the setting with the camera 1. In particular, the camera may be placed on a table or equipment rack that could be seen as a reflection in the two-way mirror. This would add an undesirable reflection of the table or equipment rack that would superimpose into the view of the image display area 17 as it is seen through the two-way mirror 2. To address this problem it would be possible to surround the camera 1 with black material that would not superimpose light into the view. With the arrangement the observer would view the flat image on the image display device 17 without light superimposing from the black setting below. While this would provide a clear view of the image on the image display device, it would only display a flat view that would not achieve the desired sense of presence with depth relationships.

Hence, there is a need for an improved system that addresses the shortcomings of the prior art mentioned above.

SUMMARY OF THE INVENTION

The problems and needs outlined above are addressed by the present invention. In accordance with one aspect of the present invention, the telepresence communications system is comprised of an image on an image display device, which is positioned directly behind the two-way mirror. The image display device may be a flat panel plasma or LCD monitor, rear projection video system, front projection on a screen or other image display method capable of displaying moving images. For the purpose of clarity the vertical plane of the image on the image display system is described as a first plane. A second plane is described as a plane parallel to the first plane and further away from the user. A backdrop is positioned further away from the two-way mirror than the image on the image display device so that a reflection of the backdrop appears in the location of the second plane. The two-way mirror and the backdrop are set at angles that will result in the reflection of the backdrop appearing in a vertical orientation to match the location the second plane. The user in the observation zone will see the superimposed images of the first plane comprised of the image on the image display device appearing in front of the second plane comprised of the reflected image of the backdrop.

A camera is located in the backdrop, such that the camera views the observation zone as a reflection off the two-way mirror. The camera could be positioned behind the backdrop with a view through an aperture for the lens to see through to the view of the reflection of the observation zone off the two-way mirror. A reflective mirror could be located behind an aperture in the backdrop in the view of the camera so that the camera views the observation zone as a reflection off the two-way mirror and the reflective mirror.

A light-absorbing panel could be positioned on the side of the two-way mirror opposite the camera and located in the view of the camera through the mirror as the camera is aligned to view the reflection of the observation zone off the two-way mirror. The light-absorbing panel could be a matt black fabric or other light-absorbing material to minimize the amount of light that would be superimposed with the view of the reflection of the view of the observation zone.

The camera could be positioned in the location where the view reflected off the two-way mirror would be approximately at the height of the eye level of a transmitted person appearing on the image of the image display device. In this way the user looking at the eye level of the transmitted image of the person on the image display device would be looking in the direction of the reflected camera.

A black area, such as a panel covered with black material, matching the width of the backdrop could be positioned in the location of the second plane to match the superimposed image of the reflected backdrop. This would result in a view of the reflection of a backdrop comprised of an illuminated visible material, which would be more clearly visible to the user than the direct view of the black area. As a result, the user would see the direct view of the image on the image display device on the first plane in front of the reflected backdrop on the second plane with the backdrop and the two areas matching in width. Outside of the width of the backdrop and the black area the user would see a direct view of the room setting to the sides. Part of the view could include a view through the two-way mirror to the room setting to the sides of the reflected backdrop. In this view through the two-way mirror that is outside of the reflected backdrop, the objects surrounding the backdrop could reflect in the two-way mirror. Therefore, it is advantageous to have these objects, such as the supporting structure for the backdrop and the surrounding floor, to be dark in color and not highly illuminated.

The backdrop in the reflected second plane could have a mixture of colors, patterns, textures and/or an undulation or variation in depth within the surface area to produce greater depth cues relative to the superimposed image on the first plane. Furthermore, the backdrop could have multiple planes extending back from the reflected second plane to display additional depth cues.

The configuration could have the backdrop located below the two-way mirror. Alternatively, the configuration could have the backdrop located above the two-way mirror The image display device could have an exposed image area surrounded by a black enclosure to contain the image display device with the image area being positioned substantially within the first plane. The outer edges of the backdrop on the reflected second plane could be extended toward the two-way mirror to match the superimposed position of the left and right sides of the black enclosure at the first plane.

The image display device with an exposed image area could be surrounded by a black enclosure containing the image display device. The image area could be at the location of the first plane and the black enclosure would have edges at the first plane. The black enclosure could also have edges located at a second plane behind the first plane. The width of the black enclosure at the second plane would be wider so that the left and right edges would be within the view of the user from the observation zone. The backdrop could be positioned further away from the two-way mirror to be at a location that is reflected into a position of a third plane parallel to the second plane and behind the second plane. The left and right sides of the backdrop could extend from the reflected third plane to the reflected second plane. The locations of the left and right extended edges of the sides of the backdrop could match the width of the black enclosure at the second plane to superimpose within the view of the user from the observation zone. In this manner the image displayed on the image display device on the first plane will be both in front of the left and right edges of the reflected backdrop at the second plane and additionally further in front of the middle of the backdrop superimposed in the third plane.

The present invention has advantages over previous configurations that superimposed a reflected image of a person into the three dimensional setting of a room. Since the present invention allows for the direct viewing of an image on an image display system, the image is not degraded by a superimposed room background that could produce a ghost effect. Some previous configurations used a physical backdrop behind the superimposed image of the transmitted person so that the room setting did not wash out the image. However, the requirement for a physical backdrop behind the image caused the display system to be excessively bulky. In contrast, the present invention is compact since the backdrop is reflected to appear behind the image on the image display system. In this way the embodiment of the invention is by comparison much smaller.

Another advantage of the present invention is that the configuration can be folded up to become very compact when not in usage. This makes it possible for the communications system to be stored in a small space. Also, it may be small enough when folded up to pass through a standard single doorway. For convenience in moving the invention may be placed on casters.

The present invention is compact enough that it can fit within a standard aisle width in a store. This makes it ideal for usage in retail and commercial applications as a kiosk, information booth or product promotions display. The free floating image in the communications system is excellent for attracting attention to the life-size image of a person in a busy retail environment. It is also ideal for displaying floating graphic and product images for promotional purposes.

The present invention provides a sense of presence of the transmitted person, which can be very important for many business applications. In particular, banking applications can provide eye contact between a banker and a customer. This eye contact is important in maintaining trust and personal contact in the business relationship. The compact size of the embodiments of this invention makes it practical for uses in banking locations which have limited space.

The present invention is scalable to a larger size, which is very important for communication with larger groups. In particular, the invention can display a group of people while providing eye contact and a sense of presence in a three dimensional setting. It can also provide a large image area for one person to move in freely. This can be very useful for teaching applications where the teacher wants to move at the front of the room. The invention can incorporate the display of presentations, data and graphics to support the training, teaching or presentation activity.

BRIEF DESCRIPTION OF THE DRAWINGS

The above features of the present invention will be more clearly understood from consideration of the following descriptions in connection with accompanying drawings in which:

FIG. 10 illustrates a third embodiment of the present invention with the width of the backdrop matching the width of a black area positioned at a second plane behind the first plane of the image on the image display system;

FIG. 11 illustrates a top view of FIG. 10;

FIG. 12 illustrates a perspective view of FIG. 11;

DETAILED DESCRIPTION OF ILLUSTRATIVE EMBODIMENTS

Figure 1:
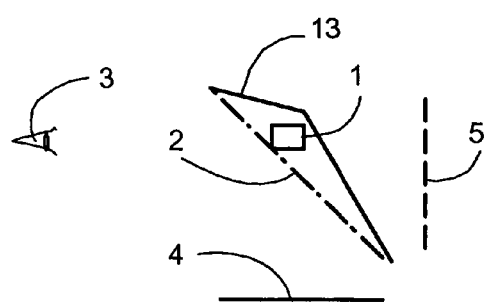
FIG. 1. illustrates a prior art configuration displaying a reflected image of a person positioned in the line of sight of the observer to simulate eye contact.
Figure 2:
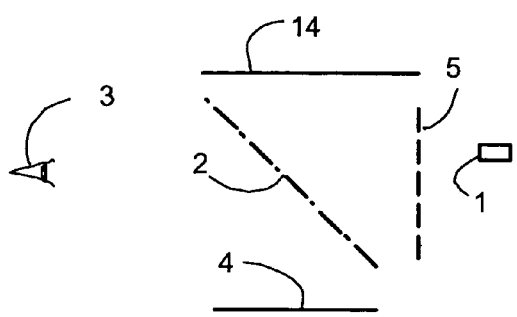
FIG. 2. illustrates a prior art configuration displaying a reflected image of a person with a camera in the background setting.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

Figure 5:
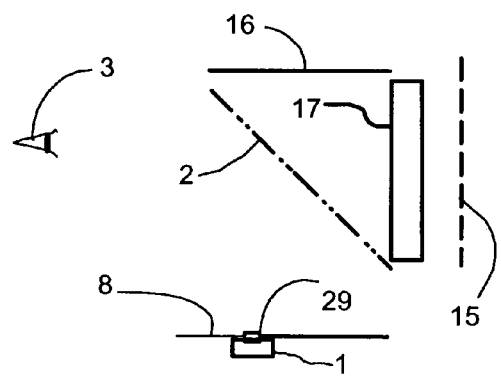
FIG. 5 illustrates the first embodiment of the present invention with the image of a person on an image display device at a first plane and a backdrop on a reflected second plane.

FIG. 5 shows an embodiment of the present invention with a displayed image 17 located at a first plane which is viewed by an observer 3 through a two-way mirror 2. A light colored or illuminated backdrop 8 is a distance from the two-way mirror 2 that is viewed as a reflection 15 by the observer 3 at a second plane. The backdrop 8 is positioned further away from the two-way mirror 2 than the image on the image display device 17 so that the reflection 15 of the backdrop at the second plane will be seen by the observer 3 to appear to be behind the image 17 on the first plane. The camera 1 is positioned along the line of sight of the displayed image of the person from the remote location. The camera 1 may be-placed behind the backdrop 8 with an aperture 29 for the lens to view through so that the camera is not clearly visible to the user. A black panel 16 is placed above the two-way mirror 2 so that the camera view through the two-way mirror does not superimpose any light into the reflected view of the observation zone surrounding the observer 3.

Figure 3:
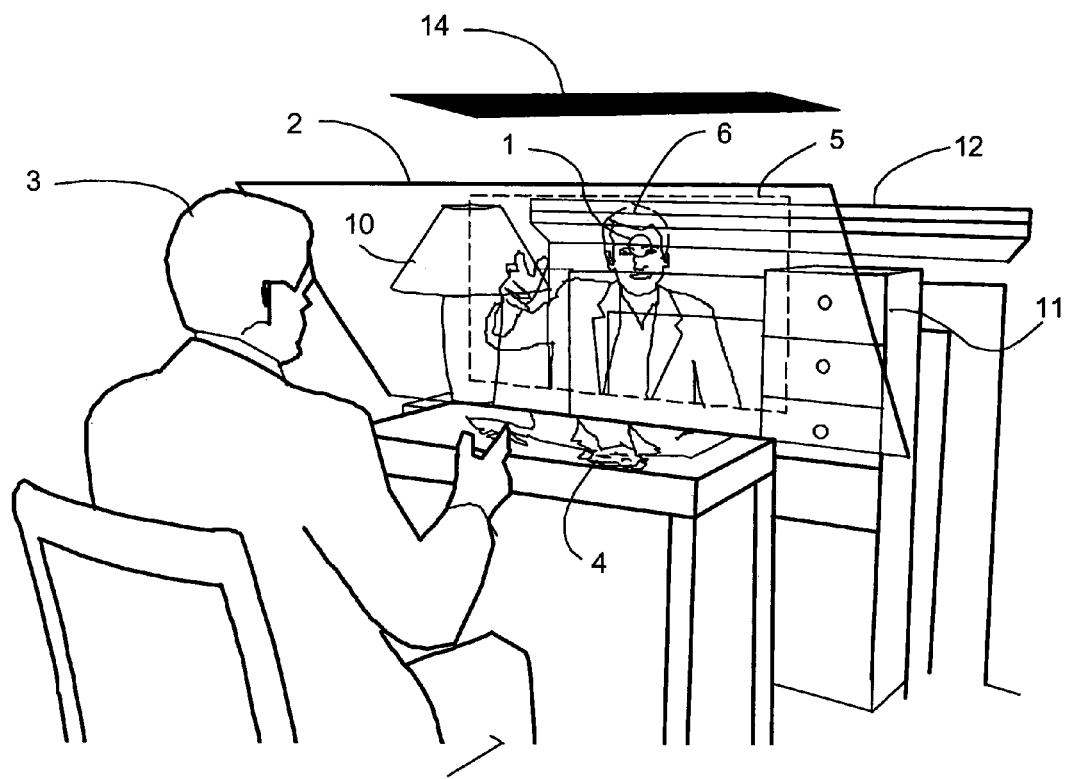
FIG. 3. illustrates a prior art configuration in a perspective view of FIG. 2.
Figure 4:
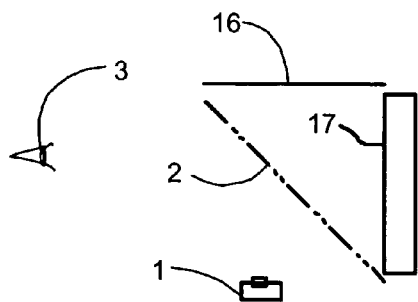
FIG. 4 illustrates a prior art configuration of a direct view of an image display device with a two-way mirror to reflect the camera view.
Figure 6:
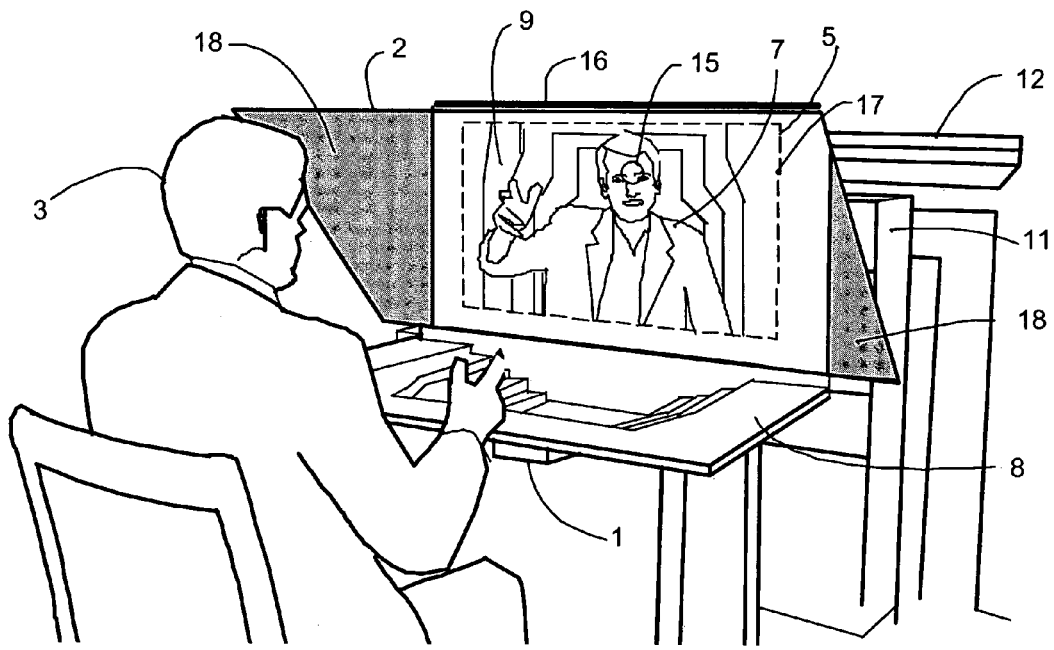
FIG. 6 illustrates a perspective view of FIG. 5.

FIG. 6 shows a perspective view of the configuration in FIG. 5. The image 7 of the person from the remote location is viewed directly through the two-way mirror 2. Since the image display area 17 is behind the two-way mirror there is not the problem of the prior art FIG. 3, which had the distraction of the direct view of image 4 on the image display system. The image 7 of the remote person is preferably produced with a black background so that the surrounding frame 5 is not visibly illuminated. A camera 1 is placed in the backdrop 8. The reflected camera view 15 is in the line of sight of the displayed person 7 from the remote location. The camera view through the two-way mirror 2 is absorbed by an overhead black panel 16. The black panel 16 allows the camera to view the reflected observation zone surrounding the observer 3 without superimposing any light from the view through the two-way mirror 2.

Since the image display area 17 is viewed directly through the two-way mirror, the image 7 is clear and undistorted. With the prior art FIG. 3 any imperfections in the mirror would distort quality of the reflected image. This is particularly critical when the two-way mirror is on a plastic or Mylar substrate. By contrast a slight imperfection in the reflection of a backdrop is not as critical as the focus of attention on the transmitted person 7. Another problem with the view of a reflection of an image in the prior is that the two-way mirror could introduce a color shift. However, the direct viewing through the two-way mirror is less prone to a color shift.

The light colored or illuminated backdrop 8 below the two-way mirror is viewed by the observer 3 as a reflection on that appears to be located at the second plane behind the first plane with the image of the transmitted person 7 on the image display device. Therefore, there is an obvious depth relationship between the image of the transmitted person 7 and the reflected backdrop 9. This achieves the desired three dimensional relationship that can produce a greater sense of presence.

The background 8 may have a pattern, texture or graphic design in order to provide depth cues for the observer 3 to clearly see the displayed image of the transmitted person 7 as being in front of the reflected backdrop 9. The backdrop may comprise a pattern of planes at different depth so that the displayed person is viewed relative to a three dimensional setting appearing behind the person. The camera 1 could be incorporated into the back of the backdrop 8 so that it is in the line of sight for eye contact.

Since the backdrop 8 and the displayed person 7 are viewed as two superimposed images, it is particularly advantageous that the brightness of the backdrop is controlled. In this invention the backdrop is produced specifically to provide the correct level of brightness to effectively achieve the desired visual effect of a three dimensional relationship of the displayed person relative to the reflected backdrop. The backdrop may be dark relative to the image of the person so that it does not appear through the person to cause a "Ghost" effect. However, it may be bright enough to be clearly visible for the purpose of providing the depth cue of a three dimensional setting relative to the person. Also, it may be bright enough to obscure the black portion of the screen surrounding the image of the remote person. In these ways, the backdrop achieves the desired telepresence effect.

The size of the backdrop may be large enough to cover the full area of the image display device. Since the image display device is viewed in front of the backdrop, a view somewhat to the side, instead of directly from the center of the screen, may require that the backdrop is larger than the image display area 17. Otherwise, the backdrop might not be large enough to cover the full image of the image display device when viewed by an observer located off to the side.

Outside of the reflected view of the backdrop will be a reflected view of the area surrounding the backdrop. In some cases, this reflection may be a view of the floor and objects on the floor. This reflected image on the two-way mirror of the surrounding area may be distracting and undesirable if it is light enough to be viewed clearly as a reflection. For this reason it is preferred that the table, supporting equipment and floor surrounding the backdrop are dark in value and are not brightly illuminated.

Figure 7:
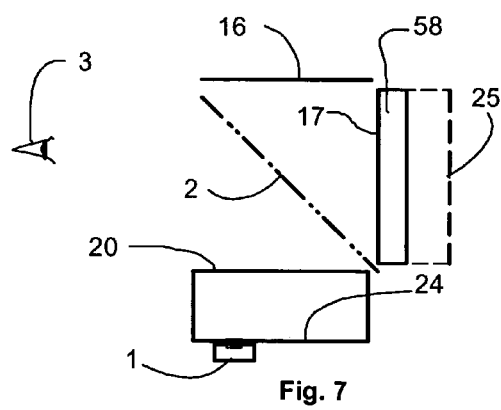
FIG. 7. illustrates a second embodiment of the present invention with the front edges of the sides of the enclosure of the image display device that match to the reflected positions of extensions of the sides from the backdrop at the reflected second plane to the reflected first plane.

FIG. 7 shows a black enclosure 58 containing an image display device with the exposed image area 17 viewed through the two-way mirror 2 by the observer 3. The image 17 is located at a first plane. A backdrop 24 is reflected in the two-way mirror 2 to appear as a reflected image 25 at a second plane. The left and right edges 20 of the backdrop extend toward the two-way mirror 2 to a position that is viewed as a reflection in the two-way mirror at the first plane to match the left and right front edges of the image display enclosure 58.

Figure 8:
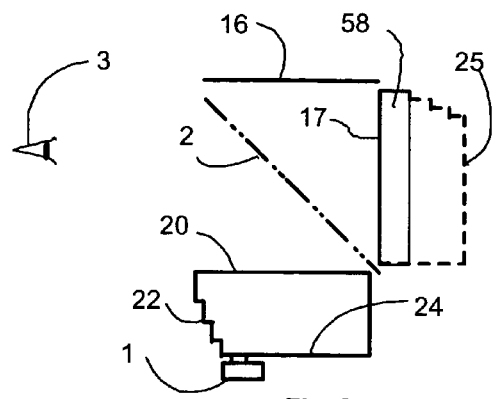
FIG. 8. illustrates a system with a backdrop comprised of multiple levels between the reflected first plane and the reflected second plane.

FIG. 8 shows multiple levels 22 of the backdrop between the front edge 20 and the back of the backdrop 24. This pattern may be used to establish a greater sense of depth as the backdrop is viewed as a reflected image extending from the first plane to the second plane. The steps back 22 may become smaller as they extend to the back. In this way it may create a foreshortening effect, similar to that used in theatrical stage sets to create an increased sense of depth.

Figure 9:
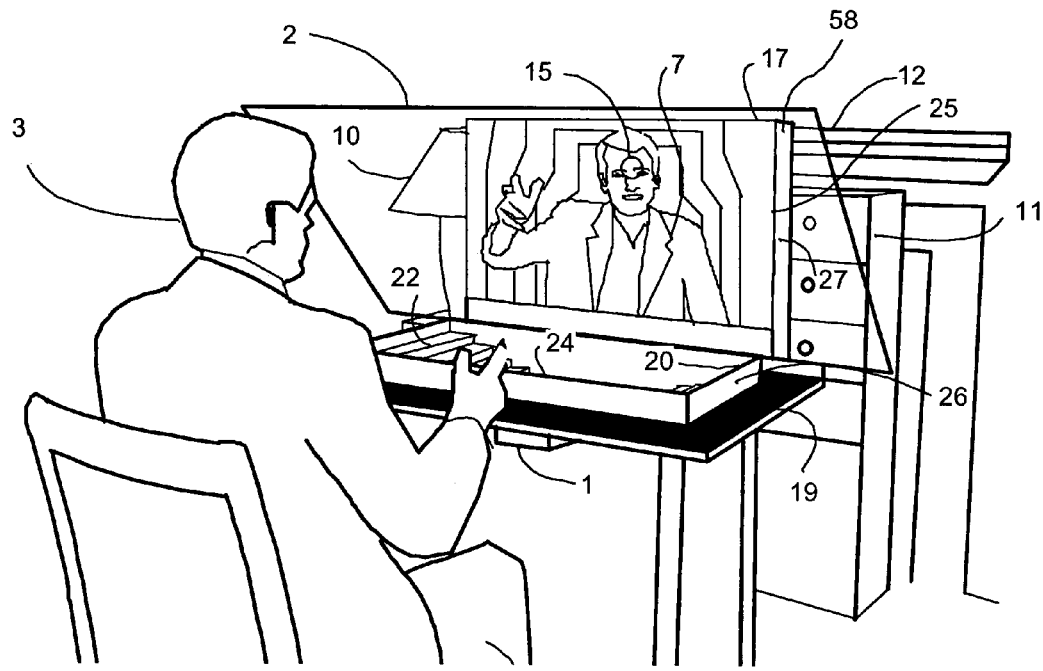
FIG. 9 illustrates a perspective view of FIG. 8.

FIG. 9 is a perspective view of FIG. 8. In this illustration the side of the black enclosure of image display device 58 matches the side of the backdrop 26. As viewed from any angle in front of the two-way mirror 2 the superimposed edges will match. In this way the view of the full area of the image display enclosure 58 will be matched with the superimposed images of backdrop surfaces 20, 22 and 24 and the image a person 7 within the image display area 17. The image of the person 7 on the first plane will appear to be in front of the reflected backdrop on the second plane 25, which will achieve a three dimensional visual effect.

Another advantageous feature of this configuration is that the area to the left and the right of the black enclosure of image display device 58 will be visible through the two-way mirror 2 to the three dimensional room setting 12. The area 19 outside of the backdrop area may be black so that it does not superimpose light to the view of the room setting 12 as the area 19 is seen as a reflection in the two-way mirror 2. The user 3 may also see a reflection of the floor in the two-way mirror 2. However, the floor may be dark and the room setting 12 may be light so that only the room setting 12 is visible in a view through the two-way mirror 2. Since the room setting 12 is seen through the two-way mirror 2, the sense of presence of the person 7 is enhanced by viewing the person 7 in the context of the depth cues of both a backdrop and a three dimensional room setting.

Light objects 10 in the room setting will not adversely affect the quality of the image 7 of the transmitted person since the light object 10 is blocked by the image display enclosure 58. The superimposed image of the reflected backdrop 25 matches to the position of the image display enclosure 58 to provide the optimal brightness for the display of the image 7 while allowing the observer 3 to clearly see the objects 10 appearing to the side of the image display device 17. In this manner the observer 3 gains a perception of the three dimensional setting of the room while having the controlled display of the image 7 against the superimposed image 25 of the backdrop.

The sides 26 of the backdrop may be a depth that will equal the depth of the sides 27 of the image display device. In this way the actual physical dimensions of the image display enclosure 58 will match the reflected backdrop in the superimposed view of both. This depth of the sides 26 and 27 may be minimal, such as 3" to 4" for the front portion of a rear projection television monitor or the side of a plasma screen.

In FIG. 10 a black panel 28 is physically located in a second plane behind or on the back of the image display enclosure 58. The exposed exterior of the image display enclosure 58 (other than the actual image display area 17) is preferably covered in a matt black surface to absorb light and minimize reflections. The black panel 28 is located the same distance away from the two-way mirror 2 as the backdrop 30 so that the reflection of the backdrop appears in the second plane to match to the position of the black panel 28.

In this illustration an optional pair of protrusions 32 is positioned so that their reflection on the two-way mirror 2 matches the first plane of the front two edges 59 of the image display enclosure 58. The protrusions 32 reflect in the two-way mirror 2 to appear to be on the first plane in front of the reflection of the backdrop 30, which appears on the second plane. Since the protrusions 32 match the perceived positions of the sides 59 of the image display enclosure 58, the reflection masks the edge 59 of the black enclosure image display device 58 from the observer 3. The protrusions 32 preferably contain lights that illuminate the backdrop 30 (and hence provide a controlled illumination of the backdrop 30 to achieve the preferred brightness to appear superimposed with the image 17.).

FIG. 11 shows a plan view of FIG. 10. The backdrop 30 is the same width as the black panel 28 so that the reflection of the backdrop 30 in the two-way mirror 2 appears in the second plane to match the width of the black panel 28. The pair of protrusions 32 preferably containing lights is positioned above the backdrop 30 in a location matching the width of the image display enclosure 58 at the front edges 59. The black panel 28 on the second plane is wider than the width of the image area 17 on the first plane so that an observer 3 would see the image area 17 contained within the width of the black panel 28 while viewing the depth relationship of the image area 17 on the first plane in front of the reflected backdrop in the position of the black panel 28.

An observer 38 located off to a side of the central axis could view the image area 17 on the first plane shifted to one side relative to the black panel 28 on the second plane. The observer 38 views from a position where the line of sight 63 passes the front edge 59 of the image display enclosure 58 on the first plane and also passes the right edge of the black panel 28 on the second plane. The observer 38 can view the three dimensional depth cues of objects in the room setting, such as an object 65 close to the edge of the black panel 28. An observer 39 is located further to the side of the central axis and has a line of sight 64 that passes the front edge 59 of the image display enclosure 58 on the first plane. However, from the position of the observer 39 a portion of the view of the room setting close to the right edge of the black panel 28 on the second plane is blocked by the image display enclosure 58. From the position of observer 39 the object 65 would be blocked from view. Since the backdrop 30 is viewed as a reflection in the second plane at the width of the black panel 28, the observer 39 will see a portion of the view from the right edge of the reflected backdrop 30 to the line of sight 64 passing the right edge 59 as a section of the image display enclosure 58. This is an undesirable effect since the observer 39 would miss the view of some depth cues, such as an object 65. It would be possible to increase the width of the black panel 28 and the corresponding width of the backdrop 30, but this would decrease the view of the background. Therefore, it is logical to determine an optimal viewing angle for observers with the understanding that viewing from outside of this range of viewing would result in an undesirable visual effect.

FIG. 12 is a perspective view of FIGS. 10 and 11. The advantage of this configuration is that the appearance of the remote person 7 would not be contained within a box with sides matching to the front edge 59 of the image display enclosure 58. The image 7 of the person would appear to be within the context of the room setting 12 in front of the backdrop 30 viewed as a reflection 21.

Figure 13:
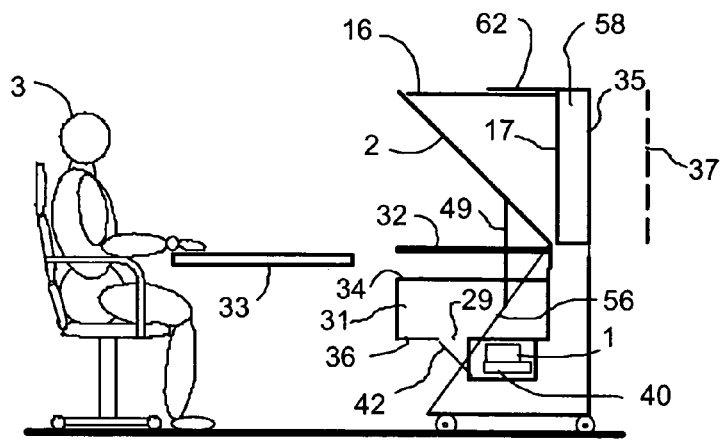
FIG. 13 illustrates a side view of a fourth embodiment of the present invention with three planes.

FIG. 13 shows an advanced embodiment of the invention with the displayed view for the observer 3 comprised of three planes. The closest plane is the first plane with the image 17 displayed on the image display device. Protrusions 32 incorporating lights are located in front of the two-way mirror 2 in a position to be reflected as superimposed reflections on the first plane. The second plane is further behind at the location of the back edge 35 of the image display enclosure 58. The middle portion of the backdrop 36 reflects in the two-way mirror 2 at a location further behind the second plane for the location of the third plane. In this embodiment the backdrop has sides 31 that extend from the backdrop middle section 36 on the reflected third plane to the front edges of the sides 34 which match to the location of the reflected second plane. The width of the image display enclosure 58 at the back edges 35 on the second plane is the same as the width of the backdrop at the edges of the sides 34 reflected on the second plane. Both the back edges 35 and the backdrop edges 34 appear superimposed at the same location of the second plane. To the left and right of the area comprised of the image display enclosure 58 and the backdrop 36 and backdrop sides 31 the observer will see through the two-way mirror 2 to the room setting behind. In the area of the superimposed images of the image display device and the backdrop the observer will see three planes, comprised of the first plane of the image 17 on the image display device, the second plane of the matched edges of the back edge 35 of the image display enclosure and the forward edge 34 of the backdrop sides 31 and further back to a third plane formed by the back of the backdrop 36 viewed as a superimposed reflection in the location 37. The embodiment has a camera 1 and codec 40 positioned below the backdrop 36. The camera 1 views a reflection off a mirror 42 and sees through an aperture 29 in the backdrop 36. The two-way mirror 2 is held by a rod 49 that is supported by a diagonal structural member 56.

Figure 14:
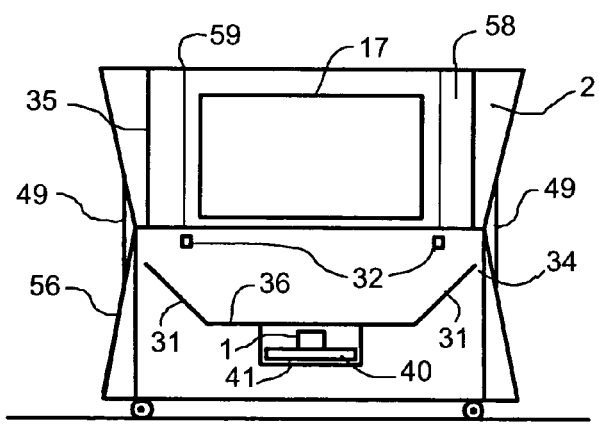
FIG. 14 illustrates a front view of the embodiment in FIG. 13

FIG. 14 illustrates a front view of the embodiment in FIG. 13. The protrusions holding the lights 32 are positioned at the same width as the front edges 59 of the image display enclosure 58. When viewed as a reflection on the two-way mirror 2 the protrusions 32 will appear superimposed on the first plane over the front edges 59 of the image display enclosure 58, which may help to obscure a direct view of the front edges as seen through the two-way mirror 2. Behind the first plane at the locations of a second plane is the back edge 35 of the image display enclosure 58 and the reflected view of the top edge 34 of the sides 31 of the backdrop. Further behind is a third plane comprised of the reflected view of the back of the backdrop 36. A camera 1 and codec 40 are located below the backdrop 36 on a shelf 41.

Figure 15:
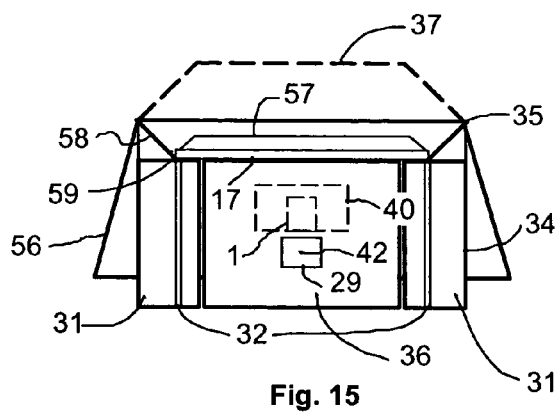
FIG. 15 illustrates a top view of the embodiment in FIGS. 13 and 14.

FIG. 15 illustrates a top view of the embodiment illustrated in FIG. 13 and 14. This illustration shows the depth relationships of the three planes. The first plane is at the location of the image area 17 displayed on the image display device 57. The second plane is further behind at the location of the back edges 35 of the image display enclosure 58. The third plane is the furthest back at location 37, which is the reflected view of the middle of the backdrop 36. The camera 1 and codec 40 are located below the backdrop 36. The camera views a reflection off a mirror 42 and sees through an aperture 29.

Figure 16:
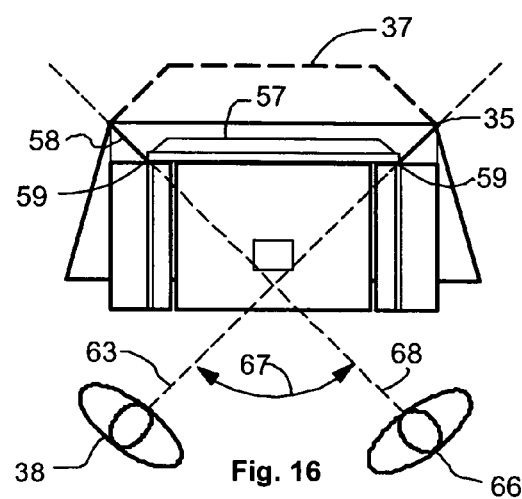
FIG. 16 illustrates optimal viewing angles for observers.

FIG. 16 illustrates the same top view of FIG. 15 with the addition of sight lines for observers. Observer 38 has a line of sight 63 that passes by the front edge 59 of the image display enclosure 58 and back edge 35 of the image display enclosure 58. Observer 66 on the opposite side has a line of sight 68 which also passes the front edge 59 and back edges 35. The preferred angle of view 67 has optimal viewing of the visual effect. In this illustration the lines of sight 63 and 68 are each 45 degrees off the central axis for a total preferred viewing angle of 90 degrees.

Figure 17:
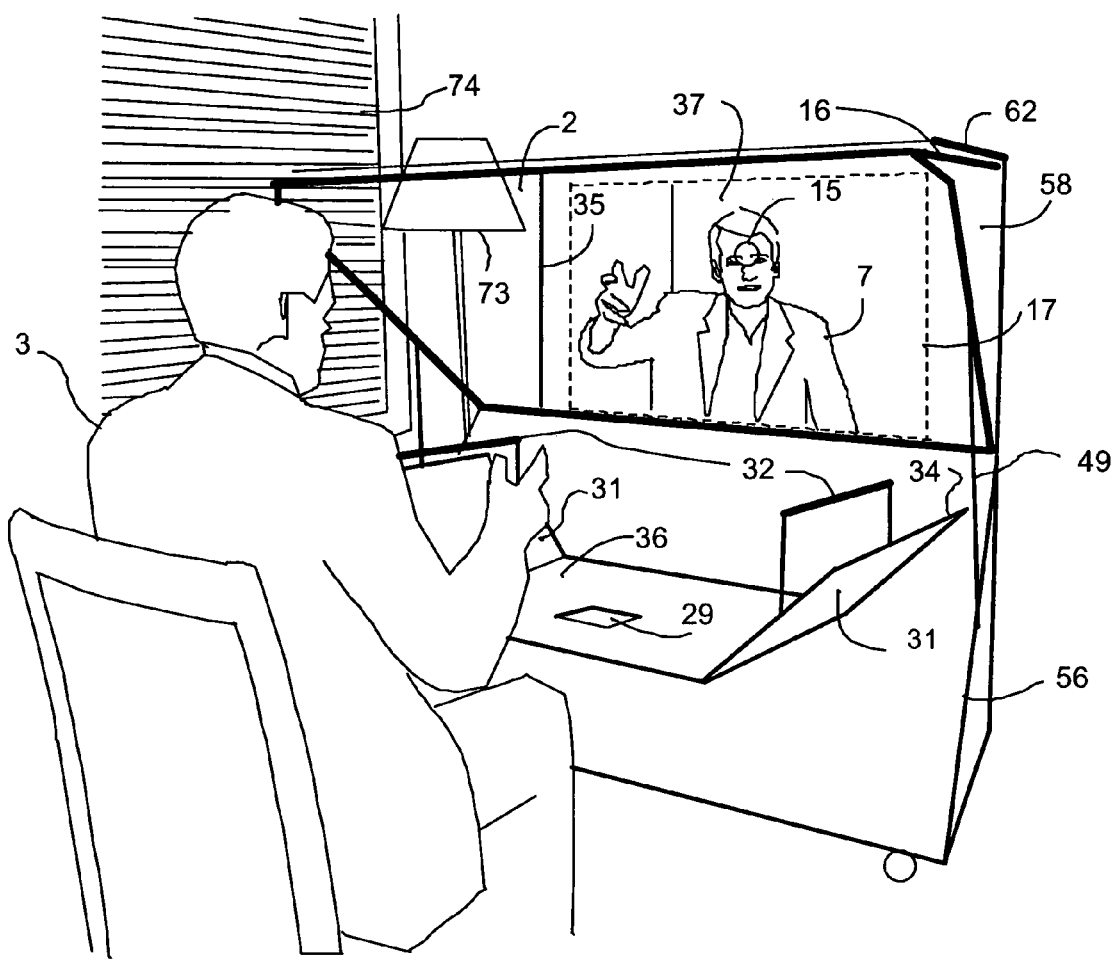
FIG. 17 illustrates a perspective view of the embodiment in FIGS. 13 through 15.

FIG. 17 illustrates a perspective view of the embodiment illustrated in FIGS. 13 through 16. The observer 3 views through the two-way mirror 2 to see the superimposed images on three planes, including a first plane with the image of a transmitted person 7 as displayed in the image display area 17. The second plane is comprised of the superimposed and matched locations of the back edge 35 of the enclosure of the image display device 58 and the reflected view of the top edge 34 of the sides of the backdrop 31. A third plane is furthest back comprised of the reflected view 37 of the backdrop 36. This perspective view illustrates the potential to see through the two-way mirror 2 to a background 74 that is to the left of the back edge 35 of the image display enclosure. In addition to the depth cues in the three planes showing the transmitted image of a person 7 and the backdrop panels 31 and 36, the observer 3 can see the depth relationship to the three dimensional setting of the room. In particular, objects such as a lamp 73 can be a depth cue and contribute to the illusion that the transmitted person 7 is within the context of the three dimensional room setting. All of the aforementioned visual effects contribute to a perception that the transmitted person 7 is actually in the room and engaging with face-to-face communication with eye contact with the observer 3.

Figure 18:
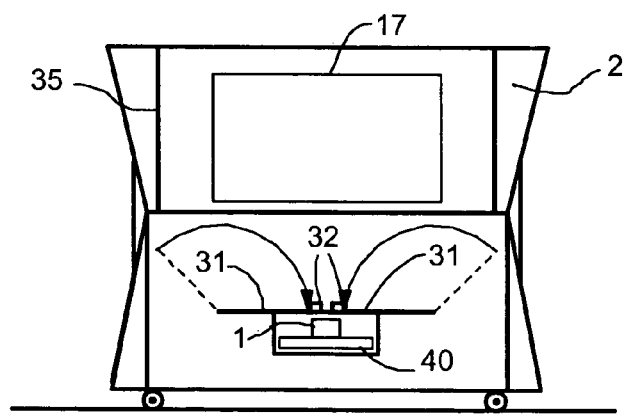
FIG. 18 illustrates a front view of the side panels and lights folded inward.
Figure 19:
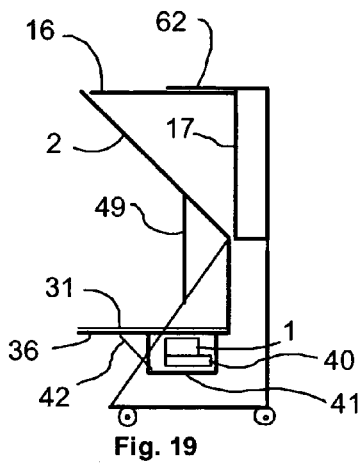
FIG. 19 illustrates a side view with the side panels and lights folded inward.
Figure 20:
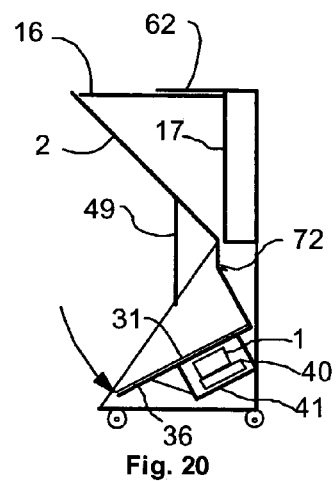
FIG. 20 illustrates the backdrop with the camera and codec rotated down.

FIG. 18 illustrates a front view of the embodiment with the side panels of the backdrop 31 and the light structures 32 folded inward. FIG. 19 is a side view of the same embodiment with the side panels 31 folded inward. FIG. 20 shows the backdrop comprising the back panel 36 and the sides 31 folded back at pivot point 72. A pair of hinges may be used at position 72 to rotate down the backdrop assembly. The camera 1 and codec 40 are attached to shelf 41 to hold them in position.

Figure 21:
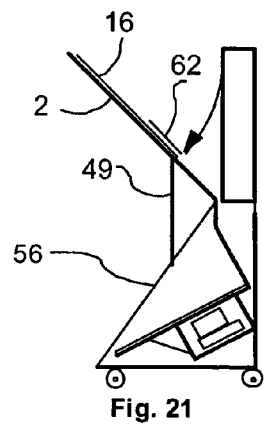
FIG. 21 illustrates the overhead panel and additional panel rotated downward.
Figure 22:
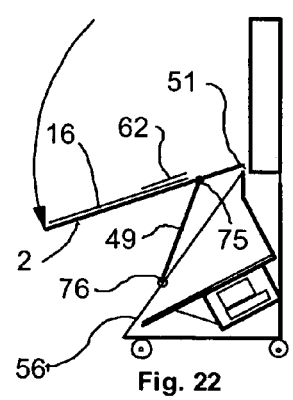
FIG. 22 illustrates the two-way mirror rotated part way downward with the sliding supporting component.

FIG. 21 shows the overhead black panel 16 and the attached overhead extension panel 62 rotated downward. FIG. 22 illustrates the two-way mirror 2 with the overhead panel 16 and overhead extension panel 62 in the process of being rotated downward at pivot point 51. A pair of hinges may be used at pivot point 51 for rotating the two-way mirror assembly. The supporting rod 49 may be attached to a fixed position on the frame of the two-way mirror 2 with a rotating mechanism 75. The rotating mechanism may be ball joint to allow for a complex angular movement of the angled edge of the two-way mirror 2 as it is lowered. The lower edge of the structural rod 49 may comprise a slider mechanism 76 that glides on the diagonal structural member 56.

Figure 23:
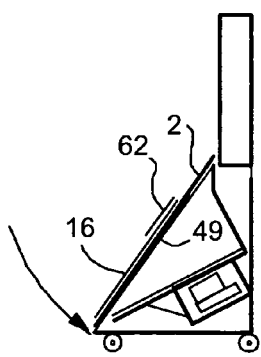
FIG. 23 illustrates the two-way mirror in a closed position with a cover of the overhead panel'
Figure 24:
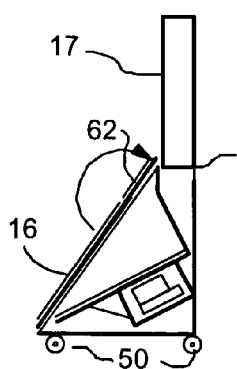
FIG. 24 illustrates the additional panel rotated upward to covered the rest of the two-way mirror.

FIG. 23 illustrates the two-way mirror 2 lowered to a position parallel with the diagonal structural member 49 with the overhead panel 16 and overhead extension panel 62 on top. FIG. 24 shows the overhead extension panel 62 rotated upward to cover the two-way mirror 2. In this closed position the image display area 17 in the image display enclosure 58 is in clear view for the display of normal video or computer display material. In this closed position the total system may be narrow enough to roll through a standard single door with the communications system on casters 50.

Figure 25:
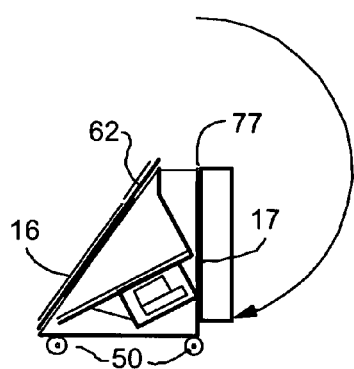
FIG. 25 illustrates the monitor enclosure rotated downward for shipping.

FIG. 25 shows the enclosure 58 for the image display device rotated downward at pivot point 77. In this arrangement the system is compact for placement in a shipping container for shipping.

Figure 26:
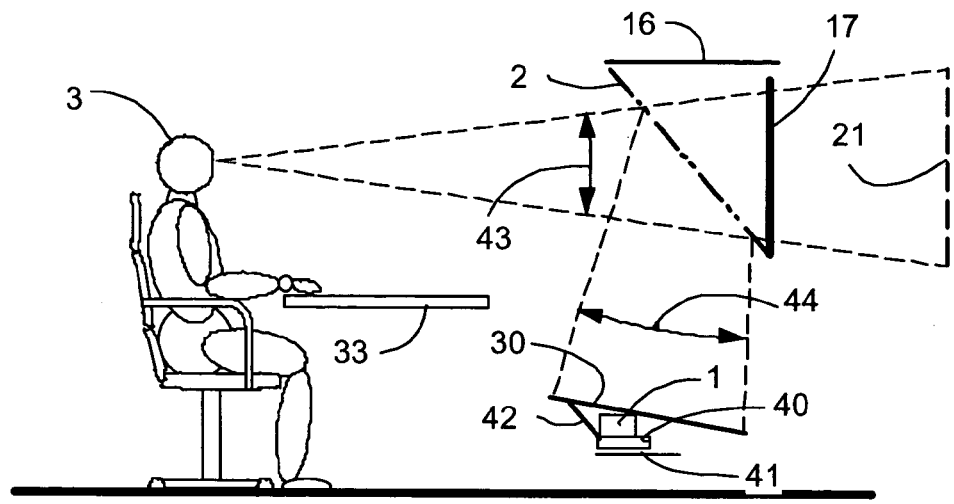
FIG. 26 illustrates a user's view of a system.

FIG. 26 shows an observer 3 seated at a table 33 with an angle of view 43 looking forward to see an image 17 displayed on an image display device on a first plane with a reflected backdrop 21 superimposed behind on a second plane. Along this same angle of view 43 the observer 3 sees a view 44 of a reflection of a backdrop 30, which is located below the two-way mirror 2. The reflection appears on a second plane that is in a location 21 behind the first plane of the image on the image display device 17. A camera 1 is placed on a shelf 41 that is incorporated into the backdrop 30. The camera 1 could be attached to a codec 40. A mirror 42 is positioned in the path of the view of the camera 1. The two-way mirror could be angled at 45 degrees so that a horizontal backdrop would appear to be vertical in the reflection. However, in this illustration the two-way mirror 2 is angled at 50 degrees with the backdrop at 10 degrees from horizontal. Other variations in angles could be implemented to achieve an end result of a reflection of a vertical superimposed backdrop at the second plane 21.

Figure 27:
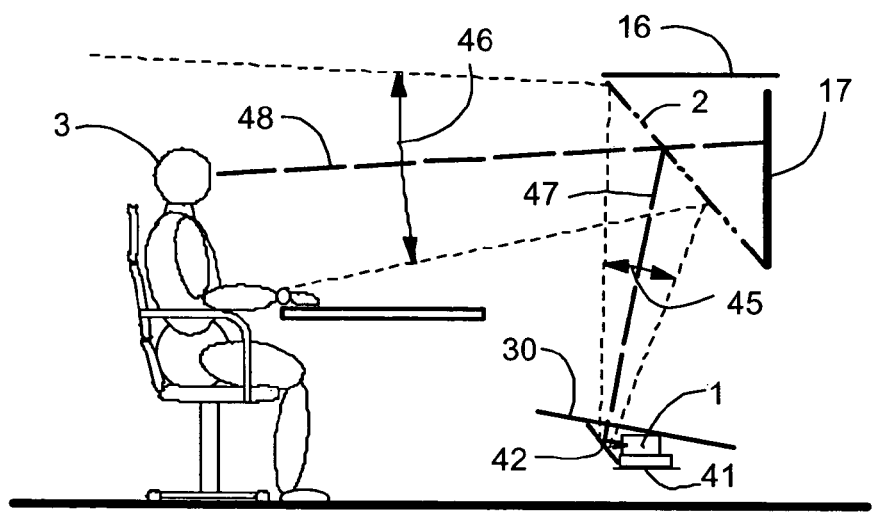
FIG. 27 illustrates the camera view of a system.

FIG. 27 shows the angle of the view 45 of the camera 1 as it is reflected off the mirror 42 directly in front of the camera 1. For the best quality of image the mirror 42 may be a front surface mirror to eliminate any unwanted secondary reflection that could be a problem with a normal glass mirror. The mirror 42 is angled so that the camera will see the angle of view 46 of the observation zone as a reflection off the two-way mirror 2. Since the mirror 42 is added in front of the camera 1, it is possible for the camera to be placed in a horizontal position on a shelf 41. This has the advantage that it is easier to place a camera 1 on a horizontal shelf 41 than securing it to a supporting structure to hold it in a vertical orientation. Another advantage of the mirror 42 is that it eliminates the problem of capturing a reversed image as would result from a single reflection off the two-way mirror 2. The double reflection results in an image captured by the camera 1 that is not inverted or flipped. This illustration shows that the direction 47 of camera 1 views a line of sight 48 that aligns with the eyes of a transmitted person appearing on the image display area 17. It is not necessary for the observer 3 and the transmitted person to be at the same height since eye contact can be achieved with the correct position of the camera at the eye level of the displayed person.

Figure 28:
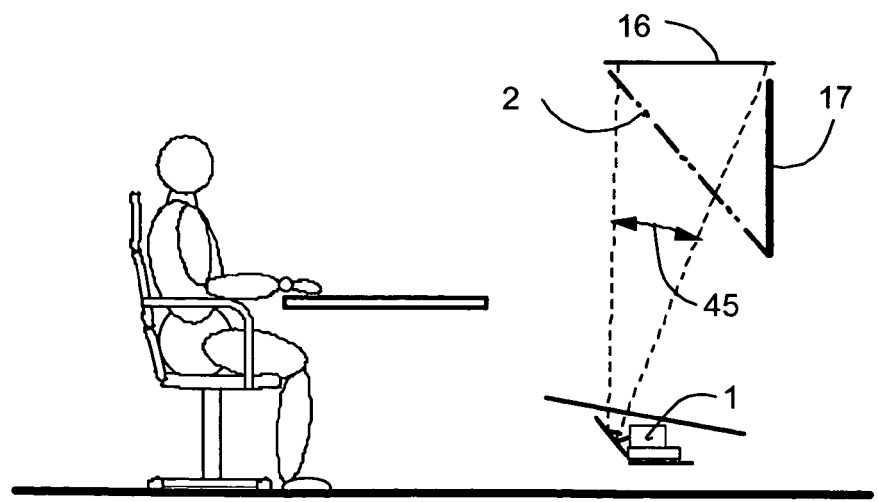
FIG. 28 illustrates the camera view through the two-way mirror to a black panel.

FIG. 28 shows the path of the view of the camera 45 as it views through the two-way mirror 2 to the black panel 16 positioned above the two-way mirror 2. In this way, extraneous light and non-essential images (e.g., the ceiling) that would detract from observation of the desired image is minimized.

Figure 29:
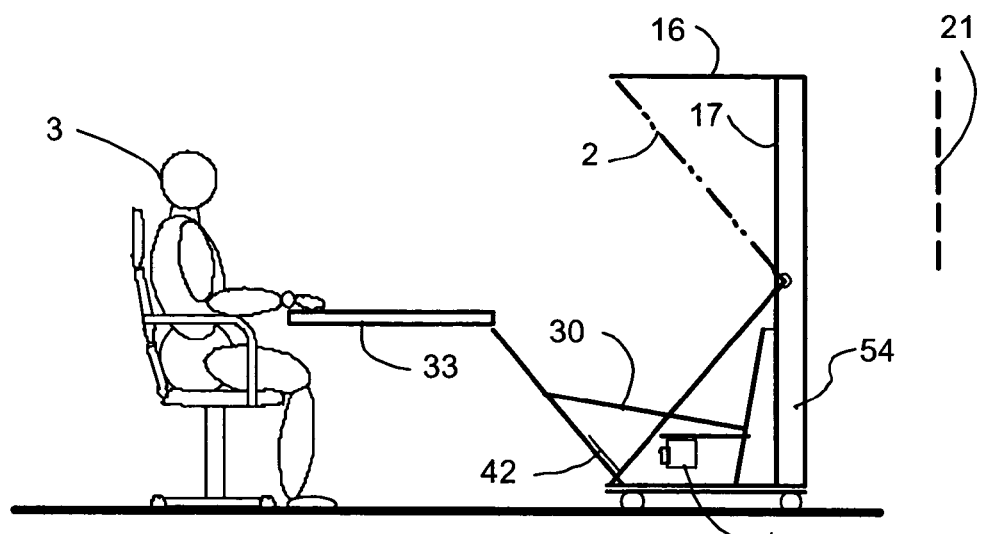
FIG. 29 illustrates a side view of a system at a table.

FIG. 29 shows an embodiment of the invention in an enclosure 54 with an observer 3 seated at a table 33. The image display area 17 on a first plane displays a portion of a life size image of a person from a remote location. The camera 1 is positioned in a backdrop 30 below the two-way mirror 2. The camera 1 is positioned to be horizontal so that it views the reflection off a mirror 42. A black overhead panel 16 is above the two-way mirror 2. The reflected image of the backdrop 30 is viewed on a second plane as a superimposed image 21 behind the first plane of the remote person displayed on the image display area 17.

Figure 30:
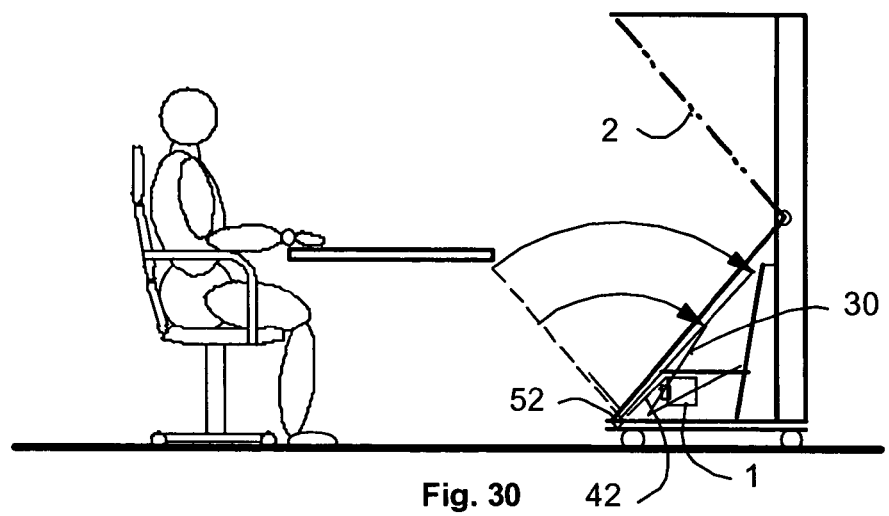
FIG. 30 illustrates the folding up of the backdrop panel.

FIG. 30 shows a portion of the backdrop 30 rotated on a pivot point 52 so that it can be folded back when the system is not in use. The mirror 42 for the camera 1 rotates back with the portion of the backdrop.

Figure 31:
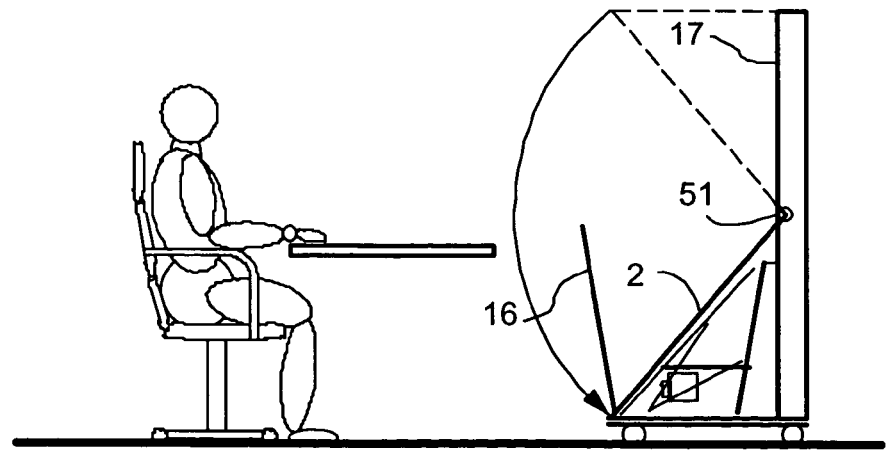
FIG. 31 illustrates the folding down of the two-way mirror.

FIG. 31 shows the two-way mirror 2 rotated on a pivot point 51 to fold down to the lower position.

Figure 32:
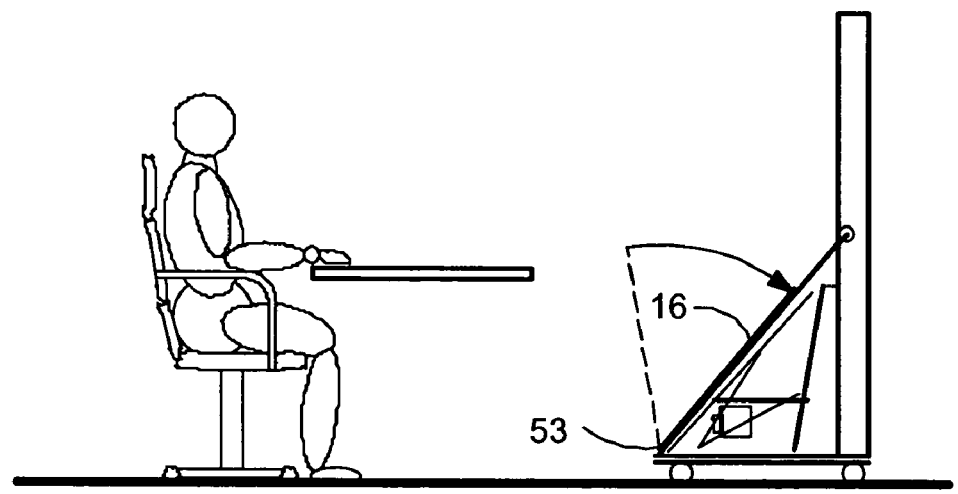
FIG. 32 illustrates the folding in of the overhead black panel.

FIG. 32 shows the black overhead panel 16 folded back along a pivot point 53.

Figure 33:
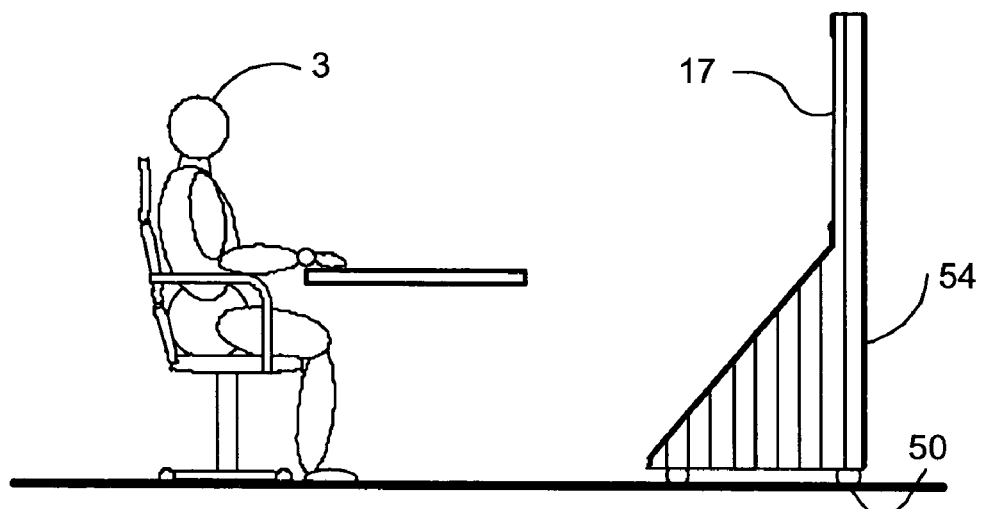
FIG. 33 illustrates a closed system with the potential of direct viewing on the image display system.

FIG. 33 shows the system in a closed position to contain the specialist display technology within the enclosure 54. The observer 3 can view the image display area 17 directly for normal viewing of video or computer images. The system is on casters 50 so that it can be rolled to another location. The system could be narrow enough to fit through a single door.

Figure 34:
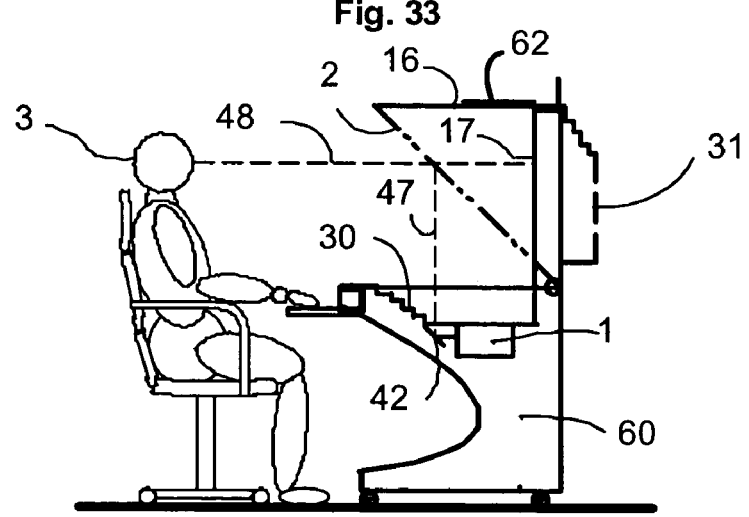
FIG. 34 illustrates an embodiment of the invention as a desk communications system.

FIG. 34 shows a configuration that provides a combination of a desk and a display system within a single enclosure 60. The two-way mirror 2 reflects a backdrop 30 that is integrated into the desk. The camera 1 is positioned horizontally with a mirror 42 in front of it so that the line of eye contact 48 is reflected 47 to the camera 1. A black panel 16 is positioned above the two-way mirror 2. The reflection of the backdrop 31 appears to be on a second plane behind the image display area 17 on a first plane.

Figure 35:
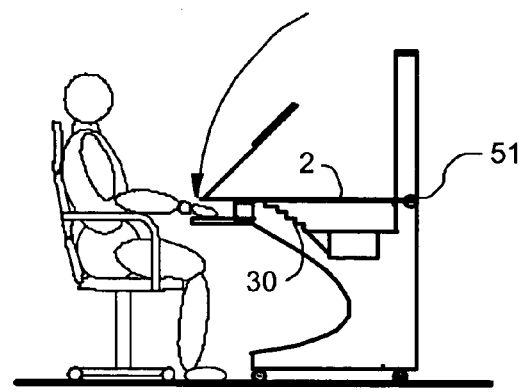
FIG. 35 illustrates the folding down of the two-way mirror.

FIG. 35 shows the two-way mirror 2 folded down on a pivot point 51 to lay horizontal on the top of the backdrop 30.

Figure 36:
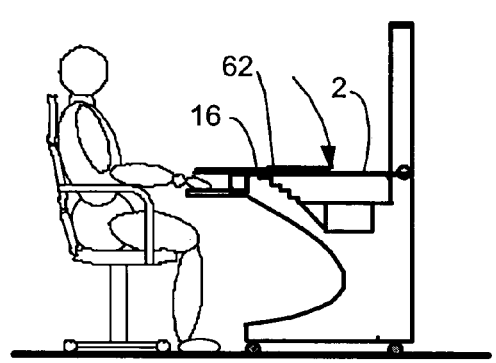
FIG. 36 illustrates the folding down of the overhead black panel.

FIG. 36 shows the black overhead panel 16 folded down to lay horizontal on top of the two-way mirror 2.

Figure 37:
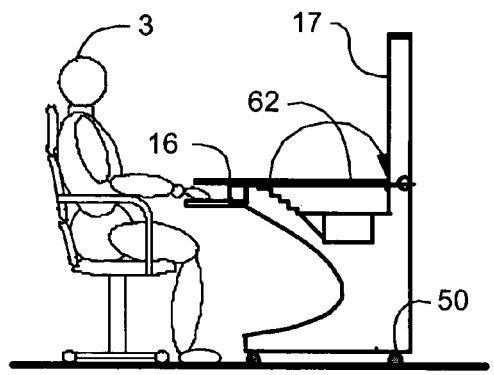
FIG. 37 illustrates the folding forward of an upper section of panel to complete a desktop surface and potential for direct viewing of the image display system.

FIG. 37 shows an additional section of panel 62 that is flipped over to cover the remainder of the horizontal surface. The exposed top of the black panels 16 and 62 could be comprised of a material that is well suited to form the top of the desk. In this closed position the observer 3 can directly view the image display area 17.

Figure 38:
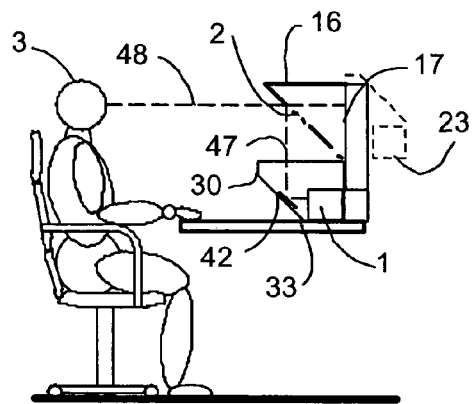
FIG. 38 illustrates an embodiment of the invention that is small enough to be placed on a table or desk.

FIG. 38 shows an embodiment of the invention that can be placed on a table or desk 33. The system has a two-way mirror 2 that is angled to reflect a backdrop 30. A camera 1 is positioned in the backdrop 30. The camera 1 is horizontal with a mirror 42 in front that is angled upward along a line of sight 47 toward the two-way mirror 2 so that it matches the line of sight 48 for eye contact with the observer 3. A black overhead panel 16 is in the camera view as seen through the two-way mirror 2. The reflected backdrop 23 on a second plane appears to be behind the image display area 17 on a first plane.

Figure 39:
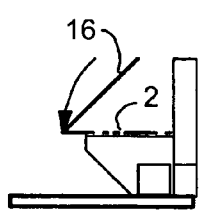
FIG. 39 illustrates the folding down of the two-way mirror.
Figure 40:
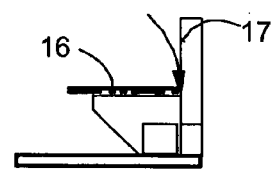
FIG. 40 illustrates the folding down of the overhead black panel for direct viewing of the image display system.

FIG. 39 shows the two-way mirror 2 lowered to a horizontal position with the black panel 16 attached. FIG. 40 shows the two-way mirror 2 and black panel 16 lowered to allow the observer to directly view video or computer images on the image display area 17.

Figure 41:
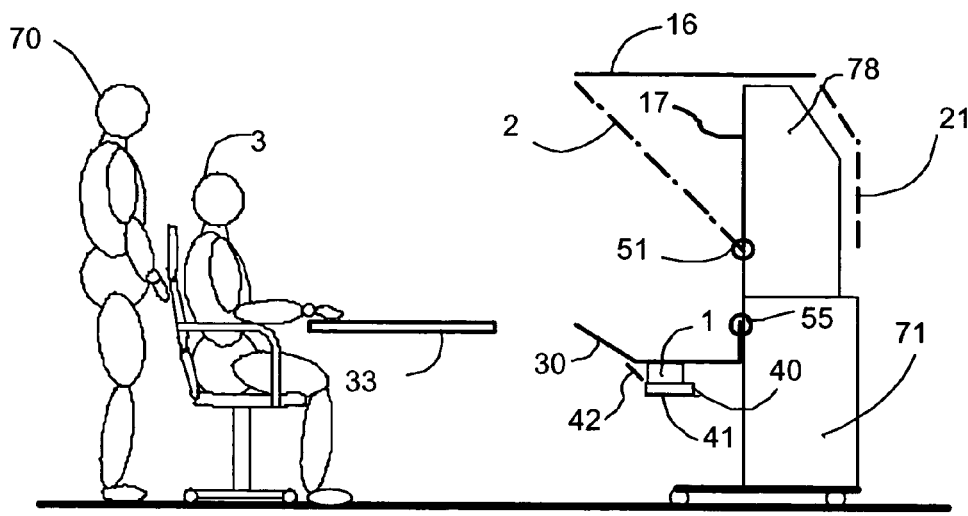
FIG. 41 illustrates an embodiment of the invention with a large rear projection image display system.

FIG. 41 shows an embodiment of the invention that is at a height that is somewhat higher than eye level for a seated person so that the display can be viewed by either a seated observer 3 or a standing observer 70. In this embodiment the image display device 78 is a rear projection video display system that is supported on a base unit 71. The two-way mirror 2 is connected to a base unit with a hinge or other pivoting device 51. A backdrop 30 is connected to the base unit 71 with a pivoting device 55. A camera 1 is in a horizontal orientation and is placed on a shelf 41 that is incorporated into the backdrop 30. A mirror 42 in front of the camera is at an angle so that the camera views the reflection of the observation zone with the observer 3. An overhead black panel 16 is positioned above the two-way mirror 2 to block any light from exposing the view of the camera 1 through the two-way mirror.

Figure 42:
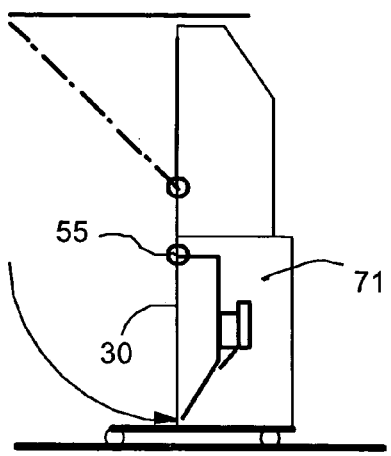
FIG. 42 illustrates the folding down of the backdrop.
Figure 43:
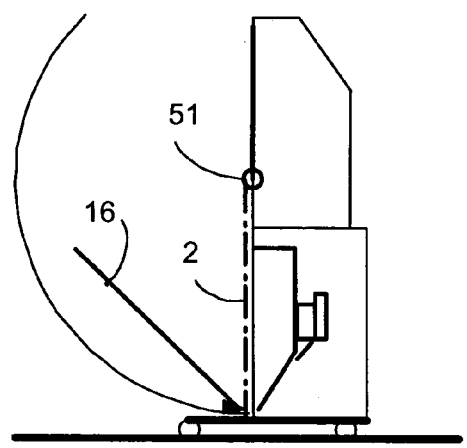
FIG. 43 illustrates the folding down of the two-way mirror.
Figure 44:
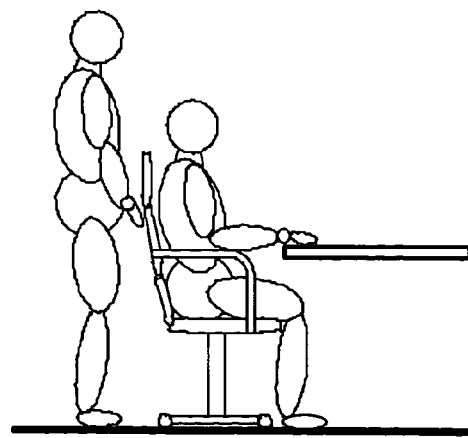
FIG. 44 illustrates the folding in of the black backdrop.

FIG. 42 shows the backdrop 30 rotated at a pivot point 55 to a position within the base unit 71. FIG. 43 shows the two-way mirror 2 rotated down at a pivot point 51 to a vertical position with the overhead black panel 16 attached. FIG. 44 shows the overhead black panel 16 rotated along the front edge of the two-way mirror 53 to a vertical position in front of the two-way mirror 2. The exposed surface of the black overhead panel 16 could be comprised of a material that provides protection of the two-way mirror 2 and is aesthetically pleasing for the exposed front of the system. In this closed position the image display area 17 is in clear view of the observers 3 and 70 so that it can be used for the display of normal video and computer graphics using the image display device 78. The system is on casters 50 so that the system could be rolled into a room for usage. The system could be narrow enough to roll through a single door.

Figure 45:
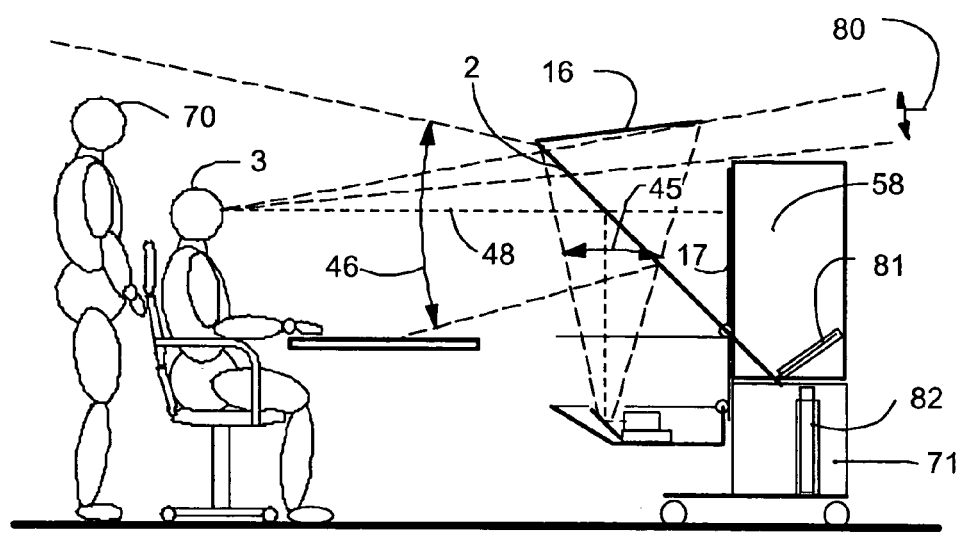
FIG. 45 illustrates the usage of an embodiment of the invention with the image of a person on the image display system at eye level.

FIG. 45 shows an embodiment of the invention that matches the line of sight 48 of a seated observer 3 with the height of the eye level of a person displayed on the image display area 17. Since the display is at eye level for a seated person it is necessary for the two-way mirror 2 to be longer than the configuration illustrated in FIGS. 41 through 44 so that a standing person 70 can view the image display area 17. The base unit 71 could have a mechanical device 82 that could raise and lower the communication system. In this way the image of the transmitted person could be raised for horizontal eye contact with a standing observer 70 or lowered for horizontal eye contact with a seated observer 3.

In this configuration the black overhead panel 16 preferably does not extend to the top of the image display enclosure 58. The smaller size overhead panel 16 is adequate to block light within the angle of view 45 of the camera 1. The black overhead panel 16 could be angled so that it is does not block the view from the position of the observer 3. The observer could see a view 80 through to the space between the image display enclosure 58 and the black overhead panel 16 so that the image of the displayed remote person does not appear to be confined by the black overhead panel 16. This would increase the perception of a sense of presence of the remote person within the three dimensional setting of the room.

Figure 46:
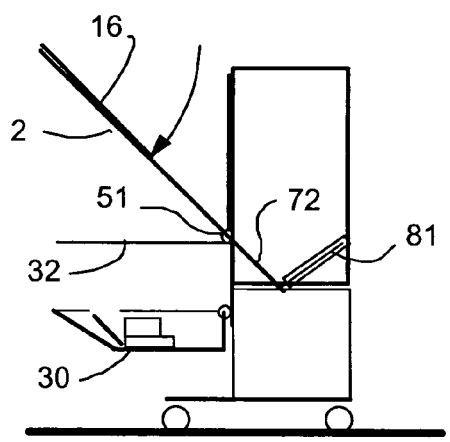
FIG. 46 illustrates the overhead black panel folding down.
Figure 47:
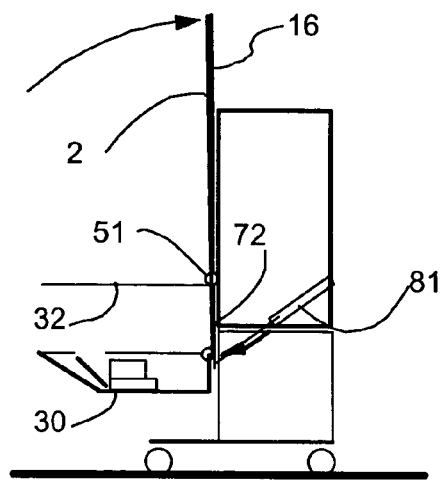
FIG. 47 illustrates the two-way mirror folding up.
Figure 48:
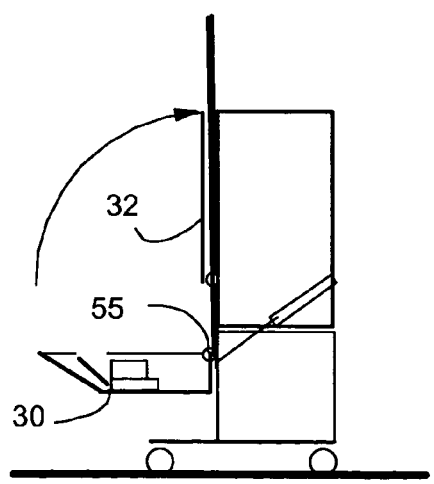
FIG. 48 illustrates the lights folding up.
Figure 49:
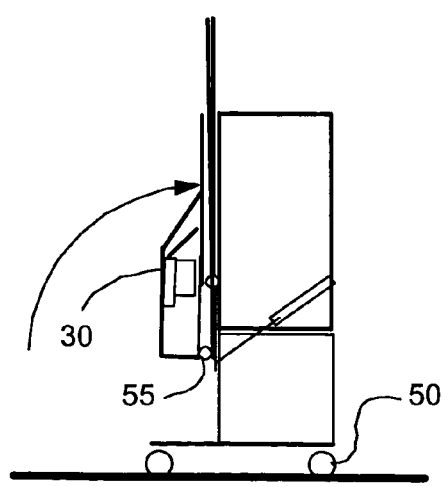
FIG. 49 illustrates the backdrop folding up.

FIG. 46 shows the black overhead panel 16 rotated down as an initial step of closing the system for storage or moving. The two-way mirror 2 is held by a structure 72, which extends beyond the pivot point 51. FIG. 47 shows the two-way mirror 2 rotated upward at the pivot point 51 to a vertical position. The structure 72 holding the two-way mirror 2 extends below the position of rotation 51. A mechanical device 81, e.g., a pneumatic cylinder or spring-loaded device, could be attached to the structure 72 at the end of the extension below the position of rotation 51, to assist in raising the two-way mirror 2. FIG. 48 shows the pair of protrusions 32, preferably including illumination sources, raised to a vertical position. FIG. 49 shows the backdrop 30 raised to a vertical position from pivot point 55. In this closed arrangement the communication system could be narrow enough to fit through a standard single door. The communication system is preferably on casters 50 to make it easy to move.

Figure 50:
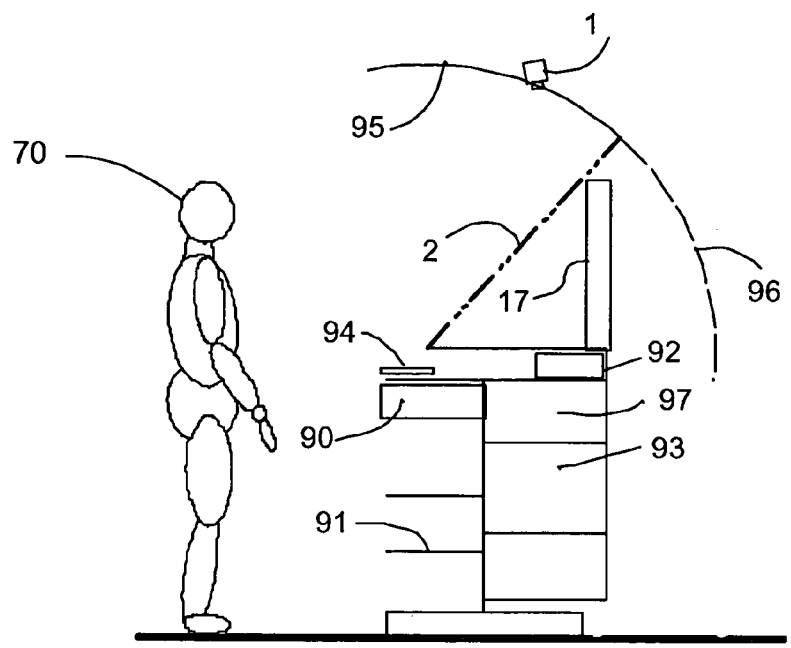
FIG. 50 illustrates an embodiment of the invention as a kiosk with the backdrop overhead.

FIG. 50 shows an embodiment of the invention integrated into a retail display or information kiosk. The two-way mirror 2 is angled to reflect a backdrop 95 above. The camera 1 is positioned along the line of sight of the image of a person displayed on the image display area 17. The backdrop 95 is reflected to appear as a superimposed image 96 behind the image display area 17. A keyboard 94 could be used to input information. Shelves 91 could be used for products. A dispensing device 97 could be used to dispense products. A payment device 90 could accept cash or credit card payments. A storage area 93 could be used to provide products for the dispensing device 97.

Figure 51:
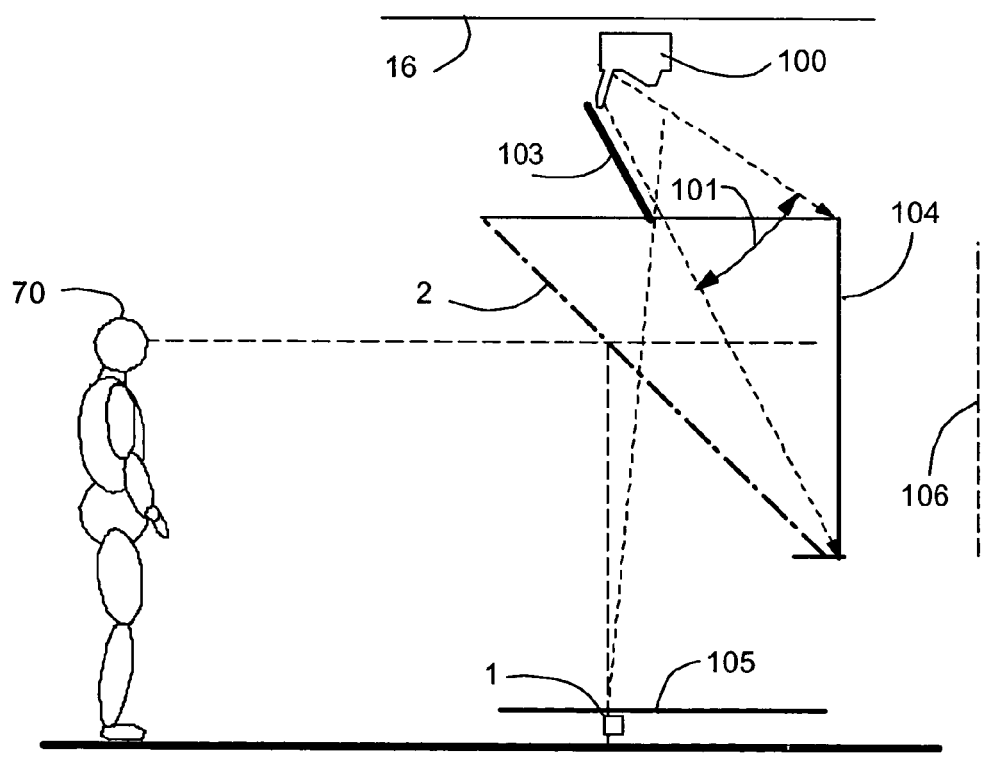
FIG. 51 illustrates a large scale embodiment of the invention with the backdrop at the level of the floor.

FIG. 51 shows a large embodiment of the invention. A standing observer 70 could view a life-size person appearing on a front projection screen 104. A projector 100 could be positioned above the two-way mirror 2 to project at an acute angle 101 toward the screen 104. A backdrop 105 could be positioned below the two-way mirror 2. The backdrop 105 would reflect in the two-way mirror 2 to appear to be a superimposed backdrop 106 behind the image plane of the screen 104. A camera 1 could be incorporated into the backdrop 105. A black panel 16 could be positioned above the two-way mirror 2. A black light baffle 103 could be positioned between the camera 1 and the projector 100 so that the projector is not within the view of the camera.

Figure 52:
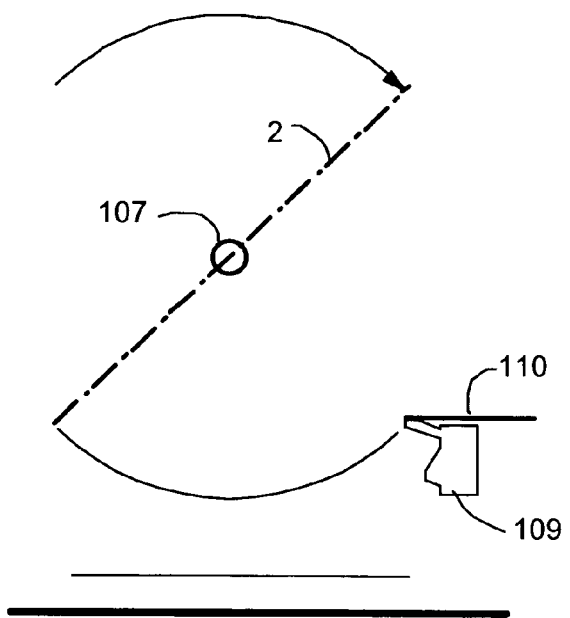
FIG. 52 illustrates the turning of the two-way mirror to the opposite direction.

FIG. 52 shows the configuration illustrated in FIG. 51 with the two-way mirror 2 rotated 90 degrees at a pivot point 107. A projector 109 is positioned below a table height panel 110. Further details regarding this configuration are provided with respect to FIG. 53.

Figure 53:
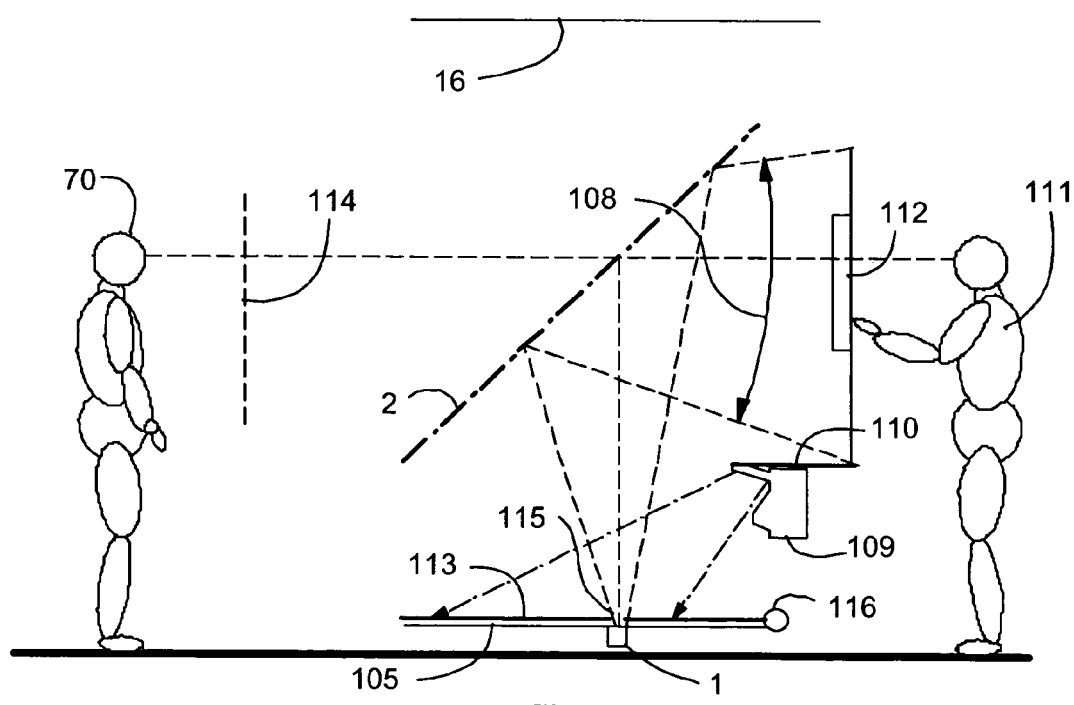
FIG. 53 illustrates the usage of the communications system for both transmission and for view of a remote audience and a real audience.

FIG. 53 shows a presenter 111 standing in a position within the view 108 of a camera 1. The camera 1 is located below the two-way mirror 2 with a small aperture 115 to view through a front projection screen 113. A black panel 16 is above the two-way mirror so that the camera view through the two-way mirror 2 does not add light to the camera image. The front projection screen 113 could be rolled out from a tube 116 to cover the backdrop 105. The camera 1 is positioned to be at eye level for the presenter 111 so that the presenter is captured at the correct angle for display at a distant location at a system as illustrated in FIG. 51. The presenter sees the reflection 114 of the image projected on the screen 113 by the projector 109 below the table height panel 110.

This configuration could allow a teacher to present to both a class in the same room and simultaneously present to a class in a distant location using a system as shown in FIG. 51. The teacher 111 would be able to make eye contact with a person 70 in the room when the room is illuminated bright enough for the teacher to clearly see the student in the room. The lighting in the class room could be dimmed so that the teacher could clearly see the reflected image 114 of the remote classroom. The teacher could easily switch between discussions with the class present in the room or two-way interaction with the class in the distant location. The teacher would be directing his or her attention in the same direction for both locations so that all students would appear to be having the presentation directed toward them. The image of the teacher could be transmitted to an unlimited number of locations simultaneously. Any interaction with a selected location would appear directly in front of the teacher for natural interaction.

A flat panel monitor 112 could be positioned at a selected height by the presenter for making notations that would be displayed for the class. Since the teacher would be facing in the direction of the classes, he or she would not need to turn away from the class as would be done with a classic blackboard.

Figure 54:
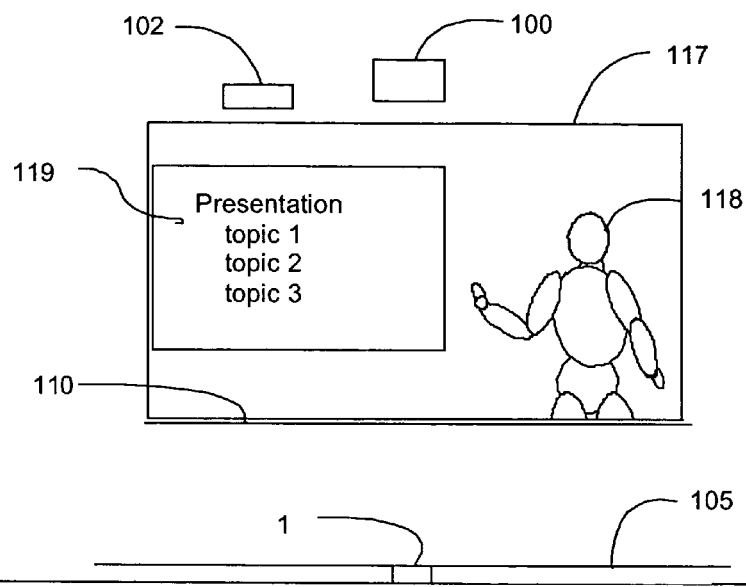
FIG. 54 illustrates a front view of FIG. 38 with a second screen for supporting visuals.

FIG. 54 shows a front view of the configuration of the large telepresence system illustrated in FIG. 51. The image area 117 is large enough for the presenter to move freely. A screen 119 shows graphics, such as a PowerPoint show or live annotations by the presenter. The image of the transmitted presenter 118 appears life-size above the level of a table 110. A projector 100 projects the image of the presenter 118. A second projector 102 projects the image of the graphic visual support 119. A backdrop 105 is reflected to appear behind the presenter 118 and the presentation screen 119.

Figure 55:
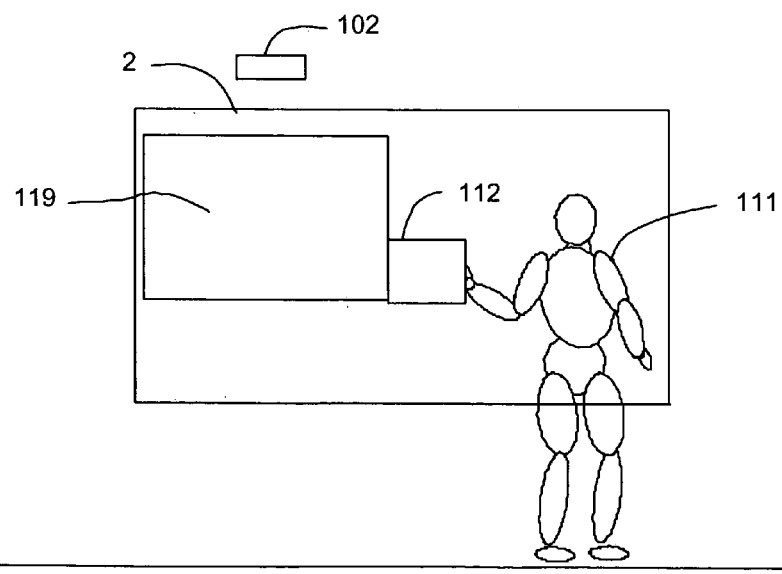
FIG. 55 illustrates an interactive panel for usage by the presenter.

FIG. 55 shows the front view of FIG. 53 with a portion of the image area 119 dedicated to a presentation, such as a PowerPoint show. This image could be projected by a second projector 102 so that the graphic image 119 would have the necessary brightness and high resolution. The image of the teacher needs to be in real time for interaction without any delay. In order to avoid excessive requirements for bandwidth this real time image is compressed. However, a graphic display 119 does not have the same requirement for quick refreshing of the image. Therefore a high resolution image can be transmitted with a small bandwidth with a slower refresh rate. It may be more practical to have one transmission for the live presentation of the teacher and a second transmission for the graphic support. Furthermore, the graphic display could be contained on a computer at the location of the class with a data sharing software to allow the presenter 111 to send commands to trigger the advancing of the images.

A flat panel monitor 112 could be positioned at a comfortable height for the presenter 111 for making notations while standing in front of the class. The notations made by the presenter could appear on the screen 119 to the side. The presenter 111 can stand to the side or can walk into the area of the image of the projected image to provide annotations.

It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments. For instance, the above described embodiments could include a microphone adapted to receive sound from the observation zone and a speaker adapted to output sound to the observation zone. A communication device receiving video images from a camera and compressing said video images for an outgoing transmission on a network to a second communication system in a remote location and a communication device receiving an incoming transmission received over a network from said second communication system in said remote location and producing therefrom a video image to be displayed on said image display device is also contemplated.

Other variations include a communications system wherein the backdrop two-way mirror, and said light-absorbing panel fold into a supporting structure when not in use; or a communications system wherein said two-way mirror and said light-absorbing panel can be folded down to form a working desk with a direct view of said image display device. The communications may include a keyboard, mouse or other interactive device to allow control of the communications system and/or access interactive visual and audio material.

The communications system may be adapted for a business transaction and further comprise a kiosk incorporating said image display device, said two-way mirror, and said camera, said kiosk further comprising a credit card reader, a product dispensing device, and storage space for the promotion and distribution of products. Yet other variations and modifications will be apparent to one skilled in the art through routine experimentation and are considered and intended to be within the scope of the following claims.

What is claimed is:

1. A communication system comprising:
   an image display device having an exposed image area being positioned substantially within a first plane, the first plane positioned for viewing by a user in an observation zone;
   a two-way mirror positioned between said observation zone and said image display device and angled to reflect a backdrop;
   said backdrop being positioned so that its reflection in said two-way mirror appears substantially within a reflected second plane, the reflected second plane being parallel with the first plane and positioned further away from said two-way mirror than the said first plane; and
   a camera located in said backdrop, such that said camera views said observation zone as a reflection off said two-way mirror.

2. The communication system of claim 1, further comprising:
   a reflective minor located behind an aperture in said backdrop in the view of said camera so that the camera views said observation zone as a reflection off the two-way mirror and the reflective mirror.

3. The communication system of claim 1 further comprising:
   a light-absorbing panel positioned on a side of said two-way mirror opposite said camera and located in the view of said camera through said two-way mirror as said camera is aligned to view said reflection of said observation zone off said two-way mirror.

4. The communication system of claim 1 wherein said camera view is substantially aligned with a user's line of sight when said user looks at the eyes of an image of a person displayed on said image display device.

5. The communications system of claim 1 wherein a black non-reflective material matching the width of said backdrop is positioned behind said two-way mirror to match the position of the superimposed image of the reflected backdrop.

6. The communications system of claim 5 wherein the area surrounding said black non-reflective material is illuminated and visible to the user through the two-way mirror and the area surrounding the backdrop is comprised of a dark material or is not illuminated and is substantially not visible to the user as a reflection in the two-way mirror.

7. The communications system of claim 1 wherein the backdrop is comprised of a combination of colors, patterns, textures and/or an undulation or variation in depth within the surface area of the backdrop.

8. The communications system of claim 1 wherein the backdrop is comprised of multiple levels that extend behind the reflected second plane.

9. The communications system of claim 1, wherein, the backdrop is positioned below the two-way mirror.

10. The communications system of claim 1, wherein, the backdrop is positioned above the two-way mirror.

11. The communications system of claim 1, wherein the backdrop, two-way mirror, and light-absorbing panel fold into a supporting structure when not in use.

12. A communication system for allowing a user located in an observation zone to communicate with a person using a communications system at another location, the communication system comprising:
an image display device having an exposed image area substantially surrounded by a black non-reflective enclosure, the image area being positioned substantially within a first plane, the first plane positioned for viewing by said user in said observation zone;
a two-way mirror positioned between said user and said image display device with said two-way mirror angled to reflect a backdrop;
said backdrop being positioned so that its reflection in said two-way mirror appears substantially within a reflected second plane, the reflected second plane being positioned parallel with the first plane and appearing further away from said two-way mirror than said first plane, said backdrop further having both the left and right sides positioned so that the respective reflections of said left and right sides off said two-way are superimposed upon left and right sides of the first plane of said black non-reflective enclosure of the image display device when viewed through the two-way mirror;
a camera positioned to view said observation zone as a reflection off said two-way mirror; and
a light-absorbing panel positioned on a side of said two-way mirror opposite said camera and located in the view of said camera through said two-way mirror as said camera is aligned to view said reflection of said observation zone off said two-way mirror.

13. The communication system of claim 12 further comprising:
a reflective mirror located behind an aperture in said backdrop in the view of said camera so that the camera views said observation zone as a reflection off the two-way mirror and the reflective mirror.

14. The communication system of claim 12 wherein said camera view is substantially aligned with a user's line of sight when said user looks at the eyes of an image of a person displayed on said image display device.

15. The communications system of claim 12 wherein a black non-reflective material matching the width of said backdrop is positioned behind said two-way mirror at a location to match the position of the superimposed image of the reflected backdrop.

16. The communications system of claim 15 wherein the area surrounding said black non-reflective material is illuminated and visible to the user through the two-way mirror and the area surrounding the backdrop is comprised of a dark material or is not illuminated and is substantially not visible to the user as a reflection off the two-way mirror.

17. The communications system of claim 12 wherein the backdrop is comprised of a combination of colors, patterns, textures and/or an undulation or variation in depth within the surface area.

18. The communications system of claim 12 wherein the backdrop is comprised of multiple depth cues that extend behind the reflected second plane.

19. The communications system of claim 12 wherein the backdrop is positioned below the two-way mirror.

20. The communications system of claim 12, wherein, the backdrop is positioned above the two-way mirror.

21. The communications system of claim 12, wherein the backdrop, two-way mirror, and light-absorbing panel fold into a supporting structure when not in use.

22. A communication system for allowing a user located in an observation zone to communicate with a person using a communications system at another location, the communication system comprising:
an image display device having an exposed image area surrounded by a black non-reflective enclosure to contain the image display device with the image area being positioned substantially within a first plane, the first plane positioned for viewing by said user in said observation zone and further said black enclosure extending into a second plane that is parallel with the first plane and is further away from the said user than the said first plane, wherein the width of the black enclosure in the second plane is wider than width of said black enclosure in the first plane so that the left and right sides of said black enclosure in the second plane are within the view of the user in said observation zone;
a two-way mirror positioned between said user and said image display device with said two-way mirror angled to reflect a backdrop;
said backdrop being positioned so that its reflection in said two-way mirror appears substantially within a reflected third plane, the reflected third plane being parallel with the second plane and being positioned further away from said two-way mirror than said second plane, said backdrop further having both the left and right sides, the respective reflections of which left and right sides appear to extend forward from the reflected third plane to the reflected second plane to match the superimposed position of the left and right sides of the second plane of said black non-reflective enclosure of the image display device when viewed through said two-way mirror by the user in the observation zone;
a camera positioned to view said observation zone as a reflection off said two-way mirror; and
a light-absorbing panel positioned on a side of said two-way mirror opposite said camera and located in the view of said camera through said two-way mirror as said camera is aligned to view said reflection of said observation zone off said two-way mirror.

23. The communication system of claim 22, further comprising:
a reflective mirror located behind an aperture in said backdrop in the view of said camera so that the camera views said observation zone as a reflection off the two-way mirror and the reflective mirror.

24. The communication system of claim 22 wherein said camera view is substantially aligned with a user's line of sight when said user looks at the eyes of an image of a person displayed on said image display device.

25. The communications system of claim 22 wherein a black non-reflective material matching the width of said backdrop is positioned in said second plane in a location to match the position of the superimposed image of the reflected backdrop.

26. The communications system of claim 25 wherein the area surrounding said black non-reflective material is illuminated and visible to the user through the two-way mirror and the area surrounding the backdrop is comprised of a dark material or is not illuminated and is substantially not visible to the user as a reflection off the two-way mirror.

27. The communications system of claim 22 wherein the backdrop is comprised of a combination of colors, patterns, textures and/or an undulation or variation in depth within the surface area.

28. The communications system of claim 22 wherein the backdrop is comprised of multiple depth cues that extend behind the reflected second plane.

29. The communications system of claim 22, wherein, the backdrop is positioned below the two-way mirror.

30. The communications system of claim 22, wherein, the backdrop is positioned above the two-way mirror.

31. The communications system of claim 22, wherein the backdrop, two-way mirror, and light-absorbing panel fold into a supporting structure when not in use.

32. An image display system for allowing a user located in an observation zone to view an image on an image display device to appear in front of a reflected backdrop, the image display system comprising:
an image display device having an image area substantially surrounded by a black non-reflective enclosure, the image area in a first plane being positioned substantially within a vertical plane, the first plane positioned for viewing by the user in an observations zone;
a two-way mirror positioned between said observations zone and said image display device and angled to reflect a backdrop;
said backdrop being positioned adjacent to said two-way mirror in a second plane further away from the two way mirror than the first plane to be reflected in the two way mirror to be parallel with the first plane in a location further away from the first plane as viewed from the observation zone;
said backdrop in the second plane to have left and right edges that project forward to match the width of the left and right edges of the black enclosure and are positioned so that a reflection of a left edge and a right edge of said backdrop in said two-way mirror substantially align from said observation zone.

33. The image display system of claim 32 wherein the black non-reflective enclosure extends from the first plane to a second plane that is parallel with the first plane and is further away from the said user than the first plane; wherein the width of the enclosure in the second plane is wider than the width of the black enclosure in the first plane so that left and right sides of said enclosure in the second plane are within the view of a user in said observation zone and wherein the backdrop is positioned so that the reflection of said backdrop in said two-way mirror appears partially within a reflected third plane, the reflected third plane being parallel with the second plane and being positioned further away from said two-way mirror than said second plane, said backdrop further having left and right sides, the respective reflections of which left and right side appear to extend forward from the reflected third plane to the reflected second plane to match the superimposed position of the left and right sides, respectively, of the second plane of said enclosure when viewed through said two-way mirror by user in the observation zone.

* * * * *